US012736670B2

(12) United States Patent
Proctor et al.

(10) Patent No.: US 12,736,670 B2
(45) Date of Patent: Sep. 15, 2026

(54) BEAMFORMING SONAR SYSTEM WITH IMPROVED SONAR IMAGE FUNCTIONALITY, AND ASSOCIATED METHODS

(71) Applicant: NAVICO, INC., Tulsa, OK (US)

(72) Inventors: Alan Lee Proctor, Owasso, OK (US); Jayme J. Caspall, Tulsa, OK (US)

(73) Assignee: NAVICO, INC., Tulsa, OK (US)

( * ) Notice: Subject to any disclaimer, the term of this patent is extended or adjusted under 35 U.S.C. 154(b) by 184 days.

(21) Appl. No.: 18/915,639

(22) Filed: Oct. 15, 2024

(65) Prior Publication Data

US 2025/0035781 A1 Jan. 30, 2025

Related U.S. Application Data

(63) Continuation of application No. 17/159,199, filed on Jan. 27, 2021, now Pat. No. 12,153,129, which is a (Continued)

(51) Int. Cl.
*G01S 15/89* (2006.01)
*G01S 7/524* (2006.01)
(Continued)

(52) U.S. Cl.
CPC .......... *G01S 15/8902* (2013.01); *G01S 7/524* (2013.01); *G01S 7/5273* (2013.01); *G01S 15/42* (2013.01); *G06T 11/00* (2013.01)

(58) Field of Classification Search
None
See application file for complete search history.

(56) References Cited

U.S. PATENT DOCUMENTS

| | | | |
|---|---|---|---|
| D278,690 | S | 5/1985 | Steensland et al. |
| 4,970,700 | A | 11/1990 | Gilmour et al. |

(Continued)

FOREIGN PATENT DOCUMENTS

| | | | |
|---|---|---|---|
| AU | 2004258175 | B2 | 9/2009 |
| AU | 2019213353 | A1 | 8/2019 |

(Continued)

OTHER PUBLICATIONS

Apr. 27, 2023 Examination Report issued in Australian Application No. 2022204376.

(Continued)

*Primary Examiner* — James R Hulka
*Assistant Examiner* — Vikas Atmakuri
(74) *Attorney, Agent, or Firm* — Nelson Mullins Riley & Scarborough LLP

(57) ABSTRACT

A system is provided for imaging an underwater environment. The system includes one or more arrays of transducer elements. Each array is operated at a fixed phase shift and varies in frequency so as to beamform multiple sonar return beams of a first range of angles and a second range of angles. The arrays can be oriented to cover the gap in sonar coverage for other arrays to create a continuous arc of sonar coverage. Accordingly, a 2D live sonar image can be formed. One or more of the multiple sonar return beams facing downwardly can be selected and used to form downward sonar images that anglers are used to, without requiring separate transducer elements. Fish arches formed using multiple sonar return beams can be positioned appropriately within a high resolution downward sonar image to form a desirable combined sonar image.

20 Claims, 29 Drawing Sheets

Related U.S. Application Data continuation of application No. 16/944,186, filed on Jul. 31, 2020, now abandoned.

(51) Int. Cl.

| | |
|---|---|
| ***G01S 7/527*** | (2006.01) |
| ***G01S 15/42*** | (2006.01) |
| ***G06T 11/00*** | (2006.01) |

(56) References Cited

U.S. PATENT DOCUMENTS

| | | | | |
|---|---|---|---|---|
| D341,093 | S | 11/1993 | Smith et al. | |
| 5,923,617 | A | 7/1999 | Thompson et al. | |
| 6,678,210 | B2 | 1/2004 | Rowe | |
| 7,035,166 | B2 | 4/2006 | Zimmerman et al. | |
| 7,106,656 | B2 | 9/2006 | Lerro et al. | |
| 7,123,546 | B2 | 10/2006 | Zimmerman et al. | |
| 7,173,879 | B2 | 2/2007 | Zimmerman et al. | |
| 7,330,399 | B2 | 2/2008 | Lerro et al. | |
| D565,977 | S | 4/2008 | Ross et al. | |
| 7,355,924 | B2 | 4/2008 | Zimmerman et al. | |
| D581,299 | S | 11/2008 | Oeth et al. | |
| 7,453,769 | B2 | 11/2008 | Kirschner et al. | |
| 7,542,376 | B1 | 6/2009 | Thompson et al. | |
| 7,542,377 | B2 | 6/2009 | Kirschner et al. | |
| 7,606,114 | B2 | 10/2009 | Bachelor et al. | |
| D613,686 | S | 4/2010 | Mueller et al. | |
| 7,847,925 | B2 | 12/2010 | Vogt | |
| 7,852,709 | B1 | 12/2010 | Lerro et al. | |
| 7,889,600 | B2 | 2/2011 | Thompson et al. | |
| 7,957,609 | B2 | 6/2011 | Lu et al. | |
| 8,254,208 | B2 | 8/2012 | Vogt | |
| 8,300,499 | B2 | 10/2012 | Coleman et al. | |
| 8,345,511 | B1 | 1/2013 | Rikoski | |
| 8,514,659 | B2 | 8/2013 | Vogt | |
| 8,638,362 | B1 | 1/2014 | Thompson et al. | |
| 8,811,120 | B2 | 8/2014 | Bachelor et al. | |
| 8,814,795 | B2 | 8/2014 | Derode et al. | |
| RE45,379 | E | 2/2015 | Rowe | |
| 8,964,507 | B2 | 2/2015 | Bachelor et al. | |
| 9,182,486 | B2 | 11/2015 | Brown et al. | |
| RE45,823 | E | 12/2015 | Vogt | |
| D751,034 | S | 3/2016 | Ye | |
| D778,906 | S | 2/2017 | Grübel et al. | |
| 9,664,783 | B2 | 5/2017 | Brown et al. | |
| 9,739,884 | B2 | 8/2017 | Proctor et al. | |
| 9,766,328 | B2 | 9/2017 | Black et al. | |
| 9,784,825 | B2 | 10/2017 | Brown et al. | |
| 9,784,826 | B2 | 10/2017 | Matson et al. | |
| D803,154 | S | 11/2017 | Delmaere | |
| 9,812,118 | B2 | 11/2017 | Matson et al. | |
| 9,846,232 | B1 | 12/2017 | Thompson et al. | |
| 10,019,002 | B2 | 7/2018 | Harnett et al. | |
| 10,067,228 | B1 | 9/2018 | Steenstrup et al. | |
| 10,114,119 | B2 | 10/2018 | Horner et al. | |
| 10,197,674 | B2 | 2/2019 | Thompson et al. | |
| 10,310,062 | B2 | 6/2019 | Coleman et al. | |
| D852,655 | S | 7/2019 | Gan | |
| D855,021 | S | 7/2019 | Ye | |
| 10,514,451 | B2 | 12/2019 | Brown et al. | |
| 10,545,226 | B2 | 1/2020 | Wigh et al. | |
| 10,605,913 | B2 | 3/2020 | Coleman et al. | |
| D895,459 | S | 9/2020 | Kang | |
| D897,326 | S | 9/2020 | Araki | |
| 10,890,660 | B2 | 1/2021 | Wigh et al. | |
| D913,983 | S | 3/2021 | Tong et al. | |
| D920,247 | S | 5/2021 | Liu | |
| 2003/0235112 | A1 | 12/2003 | Zimmerman et al. | |
| 2005/0007882 | A1 | 1/2005 | Bachelor et al. | |
| 2007/0159922 | A1* | 7/2007 | Zimmerman | G01S 15/86 367/103 |
| 2010/0067330 | A1 | 3/2010 | Collier et al. | |
| 2010/0074057 | A1 | 3/2010 | Bachelor et al. | |
| 2010/0284248 | A1* | 11/2010 | Wang | G01S 15/96 367/99 |
| 2011/0013485 | A1* | 1/2011 | Maguire | G01S 15/89 367/88 |
| 2014/0050051 | A1 | 2/2014 | Vogt | |
| 2016/0259053 | A1 | 9/2016 | Proctor et al. | |
| 2017/0212230 | A1 | 7/2017 | Wigh et al. | |
| 2017/0371039 | A1* | 12/2017 | Clark | G01S 15/87 |
| 2018/0100922 | A1* | 4/2018 | Wigh | G01S 15/87 |
| 2018/0275649 | A1 | 9/2018 | Harnett et al. | |
| 2019/0079185 | A1 | 3/2019 | Steenstrup et al. | |
| 2019/0113619 | A1* | 4/2019 | Laster | G01S 7/52003 |
| 2019/0235075 | A1 | 8/2019 | Thompson et al. | |
| 2019/0242994 | A1 | 8/2019 | Wanis et al. | |
| 2019/0265354 | A1 | 8/2019 | Antao et al. | |
| 2019/0341732 | A1 | 11/2019 | Aaron et al. | |
| 2020/0011965 | A1 | 1/2020 | Stokes et al. | |
| 2020/0072953 | A1 | 3/2020 | Wigh et al. | |
| 2020/0103512 | A1 | 4/2020 | Brown et al. | |
| 2020/0103524 | A1 | 4/2020 | Caspall | |
| 2020/0158842 | A1 | 5/2020 | Wigh et al. | |
| 2020/0256967 | A1* | 8/2020 | Wigh | G01S 7/521 |
| 2020/0300994 | A1 | 9/2020 | Matson et al. | |
| 2021/0165068 | A1* | 6/2021 | Clark | G01S 7/521 |
| 2022/0035026 | A1 | 2/2022 | Proctor | |
| 2022/0035027 | A1 | 2/2022 | Proctor | |

FOREIGN PATENT DOCUMENTS

| | | | |
|---|---|---|---|
| CA | 2530290 | C | 11/2015 |
| CA | 3032163 | A1 | 8/2019 |
| EP | 1925949 | A1 | 5/2008 |
| EP | 2294452 | B1 | 12/2011 |
| EP | 3084467 | A2 | 10/2016 |
| EP | 3144700 | A1 | 3/2017 |
| EP | 1656568 | B1 | 12/2017 |
| EP | 3479138 | A1 | 5/2019 |
| EP | 3945347 | A1 | 2/2022 |
| JP | 2007-535195 | A | 11/2007 |
| JP | 2008-508539 | A | 3/2008 |
| JP | 2010-261883 | A | 11/2010 |
| JP | 2016-510106 | A | 4/2016 |
| WO | WO-2005/008272 | A2 | 1/2005 |
| WO | WO-2006/017511 | A2 | 2/2006 |
| WO | WO-2014/126847 | A2 | 8/2014 |
| WO | WO-2019/050552 | A1 | 3/2019 |
| WO | WO-2020114107 | A1 | 6/2020 |

OTHER PUBLICATIONS

Thompson et al; "Two Dimensional and Three Dimensional Imaging Results Using Blazed Arrays;" MTS/IEEE Oceans 2001. An Ocean Odyssey. Conference Proceedings (IEEE Cat. No.01CH37295); Nov. 5-8, 2001; pp. 985-987.

Jul. 16, 2014 Video (mentioning SmartFlight); retrieved Jul. 29, 2020 from https://www.youtube.com/watch?v=hkqJh5j6eQA.

SmartFlight 2.0 video; retrieved Jul. 29, 2020 from: http://www.teledynemarine.com/smartflight2-0?ProductLineID=112.

"Garmin Marine Webinars: Panoptix LiveScope Installation and Setup;" YouTube; Apr. 6, 2020; retrieved Jan. 12, 2021 from https://www.youtube.com/watch?v=Z2AiSOmX5PA.

Nov. 26, 2021 Extended European Search Report issued in European Patent Application No. 21177698.4; 8 pp.

* cited by examiner

BEAMFORMING SONAR SYSTEM WITH IMPROVED SONAR IMAGE FUNCTIONALITY, AND ASSOCIATED METHODS

CROSS-REFERENCE TO RELATED APPLICATION

This application is a continuation of U.S. patent application Ser. No. 17/159,199, filed Jan. 27, 2021, entitled "Beamforming Sonar System with Improved Sonar Image Functionality, and Associated Methods", which is a continuation of U.S. patent application Ser. No. 16/944,186, filed Jul. 31, 2020, entitled "Beamforming Sonar System with Improved Sonar Image Functionality, and Associated Methods"; each of which is hereby incorporated by reference in its entirety.

FIELD OF THE INVENTION

Embodiments of the present invention relate generally to sonar systems, and more particularly, to beamforming sonar systems.

BACKGROUND OF THE INVENTION

Sonar (SOund Navigation And Ranging) has been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater and provide an understanding of the underwater environment. Sonar transducer elements convert electrical energy into sound or vibrations. Sonar signals are transmitted into and through the water and reflected from encountered objects (e.g., fish, bottom surface, underwater structure, etc.). The transducer elements receive the reflected sound as sonar returns and convert the sound energy into electrical energy (e.g., sonar return data). Based on the known speed of sound, it is possible to determine the distance to and/or location of the waterborne or underwater objects. The sonar return data can also be processed to be displayed on a display device, giving the user a "picture" (or image) of the underwater environment.

Different types of sonar systems provide different sonar functionality, many with differing benefits. As such, there is need for sonar systems with improved sonar image functionality while still providing a reasonable cost to the user (e.g., an angler).

BRIEF SUMMARY OF THE INVENTION

Example embodiments of the present invention provide various sonar systems for imaging an underwater environment. Some example sonar systems include one or more arrays of transducer elements and a corresponding sonar signal processor(s). The array(s) are operated to transmit sonar signals into the underwater environment. The array(s) are also operated at a fixed phase shift, but vary in frequency so as to beamform multiple sonar return beams. The multiple sonar return beams can be filtered through based on frequency between a first range of angles and between a second range of angles. A gap is formed between the first range of angles and the second range of angles. This gap can be covered up by utilizing additional arrays that are oriented differently such that a first range of angles and/or a second range of angles of that array cover (at least a portion of) the underwater volume within the gap. By using three arrays, so oriented, continuous sonar coverage extending for ~135° can be achieved. Further, with the ability to beamform multiple sonar return beams of around 0.5°-1° each all along that 135° (by varying frequency)—precise sonar return data specific to a small slice of the underwater environment can be used to form two-dimensional (2D) near-real time (or "live") sonar images.

Further, some example embodiments, provide a sonar system configured to utilize certain ones or more of the beamformed sonar return beams to form other types of sonar images. For example, anglers have gotten used to seeing downward facing sonar images that build-up over time to show a running view of the underwater environment below the watercraft. Instead of requiring additional transducer elements specifically designed to create such images, some embodiments contemplate utilizing certain ones or more of the beamformed sonar return beams. This saves space in the sonar system and provides increased functionality while saving the user from having to buy multiple sonar systems.

As an example, in some embodiments, a high resolution downward sonar image is formed by selecting the beamformed sonar return beam that is substantially straight down from the watercraft. With a beamwidth of ~1° (in the fore-to-aft direction) by ~20° (in the port-to-starboard direction), the resulting downward sonar image provides high resolution sonar imagery.

Additionally, multiple ones of the beamformed sonar return beams can be used to form a downward sonar image that produces desirable "fish arches" that anglers are used to seeing on the sonar image (indicating the presence of fish). For example, a number of beamformed sonar return beams (together facing generally downward) could be selected that together form a beamwidth of ~20° (in the fore-to-aft direction) by ~20° (in the port-to-starboard direction), with the resulting downward sonar image providing sonar imagery with the desirable fish arches. In some cases, the selected sonar return beams may span between two or more different arrays (such as depending on the orientation of the arrays and the desired volume of the underwater environment).

In some embodiments, the sonar system may be configured to present the fish arches gathered from the multiple sonar return beams into a sonar image also formed from the single sonar return beam, with the fish arches being presented at the appropriate position (e.g., depth and time). This forms a combined downward sonar image with high resolution, but also including the desirable fish arches. This may all be achieved using the one sonar system, and without dedicated linear or conical transducer elements.

In some embodiments, the specific mounting orientation and position of the arrays with respect to each other may provide a small footprint while still providing the desired functionality—which can reduce costs and reduce potential negative effects, such as drag or risk of hitting underwater objects (such as may be caused by a larger transducer assembly within the water).

In some embodiments, the above multiple types of sonar images may still be achieved with a single array of transducer elements (e.g., as opposed to two or three (or more) arrays). This provides improved sonar functionality at even less of a cost to the user.

In an example embodiment, a system for imaging an underwater environment of a body of water is provided. The system comprises at least one array of a plurality of transducer elements mounted to a watercraft on the body of water and oriented with an emitting face in a facing direction, wherein the facing direction is generally forward and downward of the watercraft. The emitting face defines a width and a length, the length of the emitting face is greater than the width of the emitting face, and the length of the emitting face extends in a fore-to-aft direction of the watercraft. Each of the plurality of transducer elements defines a length and a width, wherein the length of each of the plurality of transducer elements is greater than the width of each of the plurality of transducer elements, and wherein the length of each of the plurality of transducer elements is perpendicular to the length of the emitting face. The plurality of transducer elements are configured to transmit one or more sonar beams into the underwater environment. Each of the plurality of transducer elements are configured to operate at a fixed phase shift and vary in frequency so as to beamform multiple sonar return beams between a first range of angles in the fore-to-aft direction and a second range of angles in the fore-to-aft direction. The first range of angles is symmetrical to the second range of angles with respect to the facing direction. A gap of a third range of angles in the fore-to-aft direction separates the first range of angles and the second range of angles. The system further includes a sonar signal processor in communication with the array and configured to: operate the array to cause the plurality of transducer elements to transmit the one or more sonar beams into the underwater environment; receive sonar return data from the plurality of transducer elements of the array; and filter the sonar return data based on frequency to form the multiple sonar return beams. The sonar signal processor is further configured to generate a sonar image of the underwater environment downward from the watercraft by: determining one of the multiple sonar return beams that corresponds to an angle within the first range of angles that is substantially straight downward from the watercraft, wherein the determined one of the multiple sonar return beams forms a fan-shaped beam that is relatively narrow in the fore-to-aft direction and relatively wide in a port-to-starboard direction; determining a plurality of the multiple sonar return beams that corresponds to a fourth range of angles in the fore-to-aft direction including at least the angle within the first range of angles that is substantially straight downward from the watercraft, wherein the determined plurality of the multiple sonar return beams form a beam shape that is relatively wide in both the fore-to-aft direction and the port-to-starboard direction; and forming the sonar image from both the one of the multiple sonar return beams and the plurality of the multiple sonar return beams. The sonar image is formed from: a plurality of first sonar image portions that corresponds to sonar return data from the one of the multiple sonar return beams received at different times, wherein the plurality of first sonar image portions are built up over time; and a plurality of second sonar image portions that each correspond to a fish arch generated from the plurality of multiple sonar return beams, wherein the plurality of second sonar image portions are positioned within the plurality of first sonar image portions so as to correspond to a depth and a time associated with sonar return data taken from the plurality of multiple sonar return beams.

In some embodiments, the sonar signal processor is configured to: determine the fish arch from within sonar return data corresponding to the plurality of multiple sonar return beams that have been received across at least two or more time receipts; and generate at least one second sonar image portion based on the sonar return data corresponding to the determined fish arch. In some embodiments, the sonar signal processor is further configured to only determine the fish arch in an instance when the fish arch includes a size above a size threshold. In some embodiments, the sonar signal processor is configured to generate the at least one second sonar image portion by removing or nullifying sonar image data within the sonar return data that is not the determined fish arch.

In some embodiments, the sonar signal processor is configured to form the sonar image by: determining the depth and time associated with the sonar return data corresponding to the fish arch; and positioning the generated at least one second sonar image portion at the position within the plurality of first sonar image portions at the determined depth and time.

In some embodiments, the sonar signal processor is configured to form the sonar image by causing the plurality of second sonar image portions to overlay the plurality of first sonar image portions.

In some embodiments, the sonar signal processor is configured to form the sonar image by causing the plurality of second sonar image portions to replace corresponding portions of the plurality of first sonar image portions.

In some embodiments, the fourth range of angles includes angles that extend to each side of the angle within the first range of angles that is substantially straight downward from the watercraft. In some embodiments, the fourth range of angles are selected such that the angle within the first range of angles that is substantially straight downward from the watercraft is generally in the center of the fourth range of angles.

In some embodiments, the fourth range of angles comprises a total range of angles of at least 10°.

In some embodiments, the system further comprises an orientation sensor configured to determine an orientation of the array with respect to a top surface of the body of water, and the sonar signal processor is configured to determine the one of the multiple sonar return beams that corresponds to the angle within the first range of angles that is substantially straight downward from the watercraft based on data from the orientation sensor. In some embodiments, the sonar signal processor is configured to determine the plurality of the multiple sonar return beams that corresponds to the fourth range of angles in the fore-to-aft direction based on data from the orientation sensor.

In some embodiments, the sonar signal processor is further configured to generate a second sonar image of the underwater environment forward and downward from the watercraft, wherein the second sonar image is a two-dimensional live sonar image that is formed of sonar return data from each of the multiple sonar return beams, and wherein the sonar return data used to form the two-dimensional live sonar image was received at substantially a same time by the plurality of transducer elements.

In some embodiments, the array is a first array and the emitting face of the first array is a first emitting face and the facing direction is a first facing direction, and the system further comprises a second array of a plurality of second transducer elements mounted to the watercraft and oriented with a second emitting face in a second facing direction that is different than the first facing direction. The second facing direction is generally forward and downward of the watercraft. Each of the plurality of second transducer elements are configured to operate at the fixed phase shift and vary in frequency so as to beamform multiple second sonar return beams between a fifth range of angles in the fore-to-aft direction and a sixth range of angles in the fore-to-aft direction. The fifth range of angles is symmetrical to the sixth range of angles with respect to the second facing direction. A gap of a seventh range of angles in the fore-toaft direction separates the fifth range of angles and the sixth range of angles. The second emitting face of the second array is oriented with respect to the first emitting face of the first array such that at least one of the fifth range of angles or the sixth range of angles extends within the gap of the third range of angles from the first array. In some embodiments, the sonar signal processor is configured to determine the plurality of the multiple sonar return beams that corresponds to the fourth range of angles in the fore-to-aft direction so as to include at least one of the multiple sonar return beams from the first range of angles corresponding to sonar return data received from the first array and at least one of the multiple second sonar return beams from the fifth range of angles corresponding to sonar return data received from the second array. In some embodiments, the system further comprises a third array of a plurality of third transducer elements mounted to the watercraft and oriented with a third emitting face in a third facing direction that is different than both the first facing direction and the second facing direction, wherein the first array and the third array are mounted in an X configuration and the second array is mounted in an offset position from a center of the X configuration.

In another example embodiment, a system for imaging an underwater environment of a body of water is provided. The system comprises a single array of a plurality of transducer elements mounted to a watercraft on the body of water and oriented with an emitting face in a facing direction, wherein the facing direction is generally forward and downward of the watercraft. The emitting face defines a width and a length, the length of the emitting face is greater than the width of the emitting face, and the length of the emitting face extends in a fore-to-aft direction of the watercraft. Each of the plurality of transducer elements defines a length and a width, wherein the length of each of the plurality of transducer elements is greater than the width of each of the plurality of transducer elements, and wherein the length of each of the plurality of transducer elements is perpendicular to the length of the emitting face. The plurality of transducer elements are configured to transmit one or more sonar beams into the underwater environment. Each of the plurality of transducer elements are configured to operate at a fixed phase shift and vary in frequency so as to beamform multiple sonar return beams between a first range of angles in the fore-to-aft direction and a second range of angles in the fore-to-aft direction. The first range of angles is symmetrical to the second range of angles with respect to the facing direction. A gap of a third range of angles in the fore-to-aft direction separates the first range of angles and the second range of angles. The system further includes a sonar signal processor in communication with the array and configured to: operate the array to cause the plurality of transducer elements to transmit the one or more sonar beams into the underwater environment; receive sonar return data from the plurality of transducer elements of the array; and filter the sonar return data based on frequency to form the multiple sonar return beams. The sonar signal processor is further configured to generate a sonar image of the underwater environment downward from the watercraft by: determining one of the multiple sonar return beams that corresponds to an angle within the first range of angles that is substantially straight downward from the watercraft, wherein the determined one of the multiple sonar return beams forms a fan-shaped beam that is relatively narrow in the fore-to-aft direction and relatively wide in a port-to-starboard direction; determining a plurality of the multiple sonar return beams that corresponds to a fourth range of angles in the fore-to-aft direction including at least the angle within the first range of angles that is substantially straight downward from the watercraft, wherein the determined plurality of the multiple sonar return beams form a beam shape that is relatively wide in both the fore-to-aft direction and the port-to-starboard direction; and forming the sonar image from both the one of the multiple sonar return beams and the plurality of the multiple sonar return beams. The sonar image is formed from: a plurality of first sonar image portions that corresponds to sonar return data from the one of the multiple sonar return beams received at different times, wherein the plurality of first sonar image portions are built up over time; and a plurality of second sonar image portions that each correspond to a fish arch generated from the plurality of multiple sonar return beams, wherein the plurality of second sonar image portions are positioned within the plurality of first sonar image portions so as to correspond to a depth and a time associated with sonar return data taken from the plurality of multiple sonar return beams.

In yet another example embodiment, a transducer assembly for imaging an underwater environment of a body of water is provided. The transducer assembly comprises at least one array of a plurality of transducer elements mounted to a watercraft on the body of water and oriented with an emitting face in a facing direction, wherein the facing direction is generally forward and downward of the watercraft. The emitting face defines a width and a length, the length of the emitting face is greater than the width of the emitting face, and the length of the emitting face extends in a fore-to-aft direction of the watercraft. Each of the plurality of transducer elements defines a length and a width, wherein the length of each of the plurality of transducer elements is greater than the width of each of the plurality of transducer elements, and wherein the length of each of the plurality of transducer elements is perpendicular to the length of the emitting face. The plurality of transducer elements are configured to transmit one or more sonar beams into the underwater environment. Each of the plurality of transducer elements are configured to operate at a fixed phase shift and vary in frequency so as to beamform multiple sonar return beams between a first range of angles in the fore-to-aft direction and a second range of angles in the fore-to-aft direction. The first range of angles is symmetrical to the second range of angles with respect to the facing direction. A gap of a third range of angles in the fore-to-aft direction separates the first range of angles and the second range of angles. The transducer assembly further comprises a sonar signal processor in communication with the array and configured to: operate the array to cause the plurality of transducer elements to transmit the one or more sonar beams into the underwater environment; receive sonar return data from the plurality of transducer elements of the array; and filter the sonar return data based on frequency to form the multiple sonar return beams. The sonar signal processor is further configured to generate a sonar image of the underwater environment downward from the watercraft by: determining one of the multiple sonar return beams that corresponds to an angle within the first range of angles that is substantially straight downward from the watercraft, wherein the determined one of the multiple sonar return beams forms a fan-shaped beam that is relatively narrow in the fore-to-aft direction and relatively wide in a port-to-starboard direction; determining a plurality of the multiple sonar return beams that corresponds to a fourth range of angles in the fore-to-aft direction including at least the angle within the first range of angles that is substantially straight downward from the watercraft, wherein the determined plurality of the multiple sonar return beams form a beam shape that is relatively wide in both the fore-to-aft direction and the port-to-starboard direction; and forming the sonar image from both the one of the multiple sonar return beams and the plurality of the multiple sonar return beams. The sonar image is formed from: a plurality of first sonar image portions that corresponds to sonar return data from the one of the multiple sonar return beams received at different times, wherein the plurality of first sonar image portions are built up over time; and a plurality of second sonar image portions that each correspond to a fish arch generated from the plurality of multiple sonar return beams, wherein the plurality of second sonar image portions are positioned within the plurality of first sonar image portions so as to correspond to a depth and a time associated with sonar return data taken from the plurality of multiple sonar return beams.

In yet another example embodiment, a system for imaging an underwater environment of a body of water is provided. The system comprises at least one array of a plurality of transducer elements mounted to a watercraft on the body of water and oriented with an emitting face in a facing direction. The facing direction is generally forward and downward of the watercraft. The emitting face defines a width and a length, the length of the emitting face is greater than the width of the emitting face, and the length of the emitting face extends in a fore-to-aft direction of the watercraft. Each of the plurality of transducer elements defines a length and a width, wherein the length of each of the plurality of transducer elements is greater than the width of each of the plurality of transducer elements, and wherein the length of each of the plurality of transducer elements is perpendicular to the length of the emitting face. The plurality of transducer elements are configured to transmit one or more sonar beams into the underwater environment. Each of the plurality of transducer elements are configured to operate at a fixed phase shift and vary in frequency so as to beamform multiple sonar return beams between a first range of angles in the fore-to-aft direction and a second range of angles in the fore-to-aft direction. The first range of angles is symmetrical to the second range of angles with respect to the facing direction. A gap of a third range of angles in the fore-to-aft direction separates the first range of angles and the second range of angles. The system further includes a sonar signal processor in communication with the array and configured to: operate the array to cause the plurality of transducer elements to transmit the one or more sonar beams into the underwater environment; receive sonar return data from the plurality of transducer elements of the array; and filter the sonar return data based on frequency to form the multiple sonar return beams. The sonar signal processor is further configured to generate a first sonar image of the underwater environment forward and downward from the watercraft, wherein the first sonar image is a two-dimensional live sonar image that is formed of sonar return data from each of the multiple sonar return beams, and wherein the sonar return data used to form the two-dimensional live sonar image was received at substantially a same time by the plurality of transducer elements. The sonar signal processor is further configured to generate a second sonar image of the underwater environment downward from the watercraft, wherein the second sonar image is formed from at least one of the multiple sonar return beams that corresponds to an angle within the first range of angles that is substantially straight downward from the watercraft, wherein the second sonar image is formed of a plurality of sonar image portions built up over time, and wherein each of the plurality of sonar image portions corresponds to sonar return data from the at least one of the multiple sonar return beams received at different times.

In some embodiments, the sonar signal processor is configured to generate the second sonar image by forming the second sonar image from one of the multiple sonar return beams that corresponds to the angle within the first range of angles that is substantially straight downward from the watercraft, wherein the one of the multiple sonar return beams form a fan-shaped beam that is relatively narrow in the fore-to-aft direction and relatively wide in a port-to-starboard direction. In some embodiments, the system further comprises an orientation sensor configured to determine an orientation of the array with respect to a top surface of the body of water, and wherein the sonar signal processor is configured to determine the one of the multiple sonar return beams that corresponds to the angle within the first range of angles that is substantially straight downward from the watercraft based on data from the orientation sensor.

In some embodiments, the sonar signal processor is configured to generate the second sonar image by forming the second sonar image from a plurality of the multiple sonar return beams that corresponds to a fourth range of angles in the fore-to-aft direction including at least the angle within the first range of angles that is substantially straight downward from the watercraft, wherein the plurality of the multiple sonar return beams form a beam shape that is relatively wide in both the fore-to-aft direction and a port-to-starboard direction. In some embodiments, the system further comprises an orientation sensor configured to determine an orientation of the array with respect to a top surface of the body of water, and wherein the sonar signal processor is configured to determine the plurality of the multiple sonar return beams that corresponds to the fourth range of angles in the fore-to-aft direction based on data from the orientation sensor. In some embodiments, the fourth range of angles includes angles that extend to each side of the angle within the first range of angles that is substantially straight downward from the watercraft. In some embodiments, the fourth range of angles are selected such that the angle within the first range of angles that is substantially straight downward from the watercraft is generally in the center of the fourth range of angles. In some embodiments, the fourth range of angles comprises a total range of angles of at least 10°. In some embodiments, the sonar signal processor is further configured to generate a third sonar image of the underwater environment downward from the watercraft, wherein the third sonar image is formed from one of the multiple sonar return beams that corresponds to the angle within the first range of angles that is substantially straight downward from the watercraft, wherein the third sonar image is formed of a plurality of second sonar image portions built up over time, and wherein each of the plurality of second sonar image portions corresponds to sonar return data from the one of the multiple sonar return beams received at different times.

In some embodiments, the array is a first array and the emitting face of the first array is a first emitting face and the facing direction is a first facing direction, and the system further comprises a second array of a plurality of second transducer elements mounted to the watercraft and oriented with a second emitting face in a second facing direction that is different than the first facing direction, wherein the second facing direction is generally forward and downward of the watercraft. Each of the plurality of second transducer elements are configured to operate at the fixed phase shift and vary in frequency so as to beamform multiple second sonar return beams between a fifth range of angles in the fore-toaft direction and a sixth range of angles in the fore-to-aft direction. The fifth range of angles is symmetrical to the sixth range of angles with respect to the second facing direction. A gap of a seventh range of angles in the fore-to-aft direction separates the fifth range of angles and the sixth range of angles. The second emitting face of the second array is oriented with respect to the first emitting face of the first array such that at least one of the fifth range of angles or the sixth range of angles extends within the gap of the third range of angles from the first array. In some embodiments, the sonar signal processor is configured to generate the second sonar image by forming the second sonar image from a plurality of the multiple sonar return beams that corresponds to a fourth range of angles in the fore-to-aft direction including at least the angle within the first range of angles that is substantially straight downward from the watercraft, and the sonar signal processor is configured to determine the plurality of the multiple sonar return beams that corresponds to the fourth range of angles in the fore-to-aft direction so as to include at least one of the multiple sonar return beams from the first range of angles corresponding to sonar return data received from the first array and at least one of the multiple second sonar return beams from the fifth range of angles corresponding to sonar return data received from the second array. In some embodiments, the system further comprises a third array of a plurality of third transducer elements mounted to the watercraft and oriented with a third emitting face in a third facing direction that is different than both the first facing direction and the second facing direction, and the first array and the third array are mounted in an X configuration and the second array is mounted in an offset position from a center of the X configuration.

In some embodiments, the system further comprises a user interface including a display, wherein the user interface is configured to receive user input, and wherein the sonar signal processor is configured to receive an indication of user input indicating a desire to present the second sonar image and, in response, cause the user interface to present the second sonar image. In some embodiments, the sonar signal processor is configured to receive an indication of user input indicating a desire to present both the first sonar image and the second sonar image and, in response, cause the user interface to present both the first sonar image and the second sonar image in split screen mode.

In yet another example embodiment, a system for imaging an underwater environment of a body of water is provided. The system comprises a single array of a plurality of transducer elements mounted to a watercraft on the body of water and oriented with an emitting face in a facing direction, wherein the facing direction is generally forward and downward of the watercraft. The emitting face defines a width and a length, the length of the emitting face is greater than the width of the emitting face, and the length of the emitting face extends in a fore-to-aft direction of the watercraft. Each of the plurality of transducer elements defines a length and a width, wherein the length of each of the plurality of transducer elements is greater than the width of each of the plurality of transducer elements, and wherein the length of each of the plurality of transducer elements is perpendicular to the length of the emitting face. The plurality of transducer elements are configured to transmit one or more sonar beams into the underwater environment. Each of the plurality of transducer elements are configured to operate at a fixed phase shift and vary in frequency so as to beamform multiple sonar return beams between a first range of angles in the fore-to-aft direction and a second range of angles in the fore-to-aft direction. The first range of angles is symmetrical to the second range of angles with respect to the facing direction. A gap of a third range of angles in the fore-to-aft direction separates the first range of angles and the second range of angles. The system further includes a sonar signal processor in communication with the array and configured to: operate the array to cause the plurality of transducer elements to transmit the one or more sonar beams into the underwater environment; receive sonar return data from the plurality of transducer elements of the array; and filter the sonar return data based on frequency to form the multiple sonar return beams. The sonar signal processor is further configured to generate a first sonar image of the underwater environment forward and downward from the watercraft, wherein the first sonar image is a two-dimensional live sonar image that is formed of sonar return data from each of the multiple sonar return beams, and wherein the sonar return data used to form the two-dimensional live sonar image was received at substantially a same time by the plurality of transducer elements. The sonar signal processor is further configured to generate a second sonar image of the underwater environment downward from the watercraft, wherein the second sonar image is formed from at least one of the multiple sonar return beams that corresponds to an angle within the first range of angles that is substantially straight downward from the watercraft, wherein the second sonar image is formed of a plurality of sonar image portions built up over time, wherein each of the plurality of sonar image portions corresponds to sonar return data from the at least one of the multiple sonar return beams received at different times.

In yet another example embodiment, a transducer assembly for imaging an underwater environment of a body of water is provided. The transducer assembly comprises at least one array of a plurality of transducer elements mounted to a watercraft on the body of water and oriented with an emitting face in a facing direction, wherein the facing direction is generally forward and downward of the watercraft. The emitting face defines a width and a length, the length of the emitting face is greater than the width of the emitting face, and the length of the emitting face extends in a fore-to-aft direction of the watercraft. Each of the plurality of transducer elements defines a length and a width, wherein the length of each of the plurality of transducer elements is greater than the width of each of the plurality of transducer elements, and wherein the length of each of the plurality of transducer elements is perpendicular to the length of the emitting face. The plurality of transducer elements are configured to transmit one or more sonar beams into the underwater environment. Each of the plurality of transducer elements are configured to operate at a fixed phase shift and vary in frequency so as to beamform multiple sonar return beams between a first range of angles in the fore-to-aft direction and a second range of angles in the fore-to-aft direction. The first range of angles is symmetrical to the second range of angles with respect to the facing direction. A gap of a third range of angles in the fore-to-aft direction separates the first range of angles and the second range of angles. The transducer assembly further includes a sonar signal processor in communication with the array and configured to: operate the array to cause the plurality of transducer elements to transmit the one or more sonar beams into the underwater environment; receive sonar return data from the plurality of transducer elements of the array; and filter the sonar return data based on frequency to form the multiple sonar return beams. The sonar signal processor is further configured to generate a first sonar image of the underwater environment forward and downward from the watercraft, wherein the first sonar image is a two-dimensional live sonar image that is formed of sonar return data from each of the multiple sonar return beams, and wherein the sonar return data used to form the two-dimensional live sonar image was received at substantially a same time by the plurality of transducer elements. The sonar signal processor is further configured to generate a second sonar image of the underwater environment downward from the watercraft, wherein the second sonar image is formed from at least one of the multiple sonar return beams that corresponds to an angle within the first range of angles that is substantially straight downward from the watercraft, wherein the second sonar image is formed of a plurality of sonar image portions built up over time, wherein each of the plurality of sonar image portions corresponds to sonar return data from the at least one of the multiple sonar return beams received at different times.

Associated methods of operating and manufacturing various example systems and transducer assemblies described herein are also contemplated.

BRIEF DESCRIPTION OF THE DRAWINGS

Figure 1:
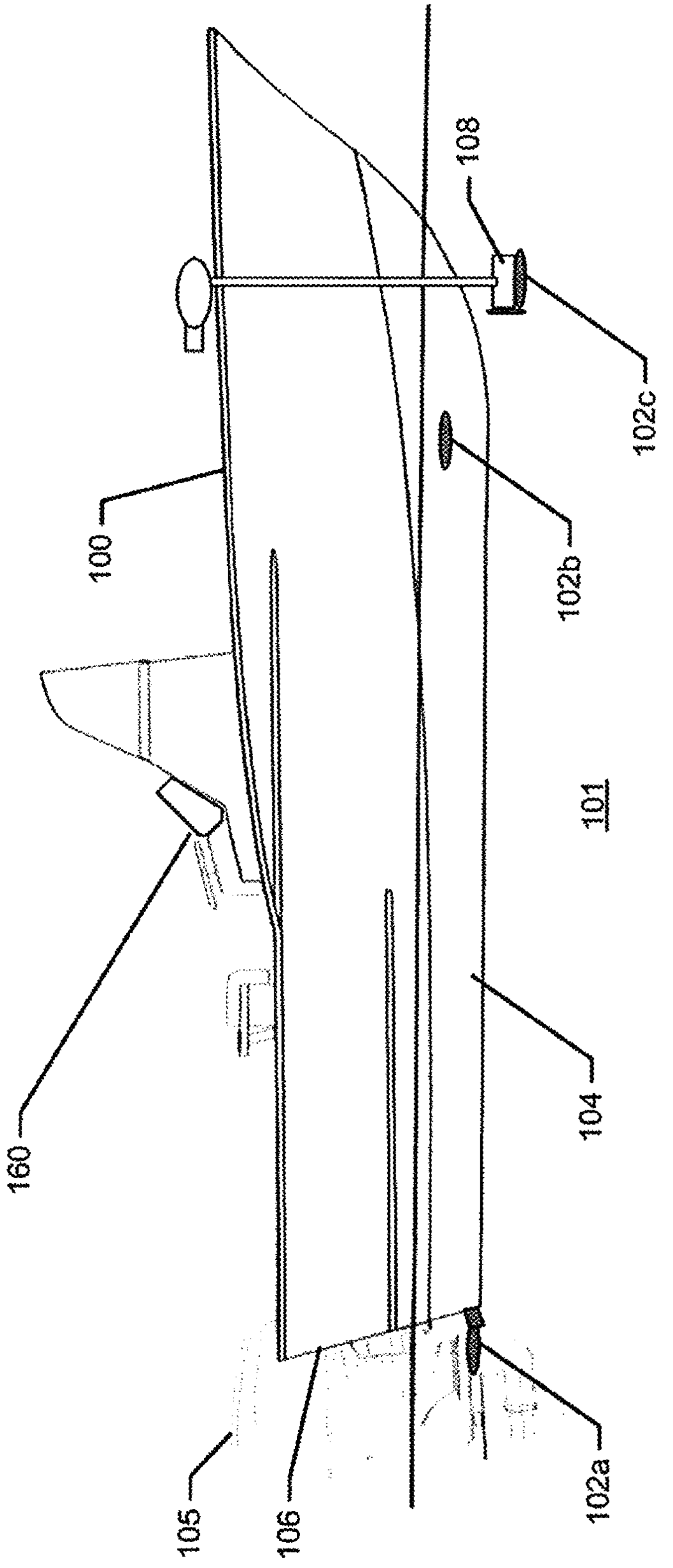
Figure 2A:
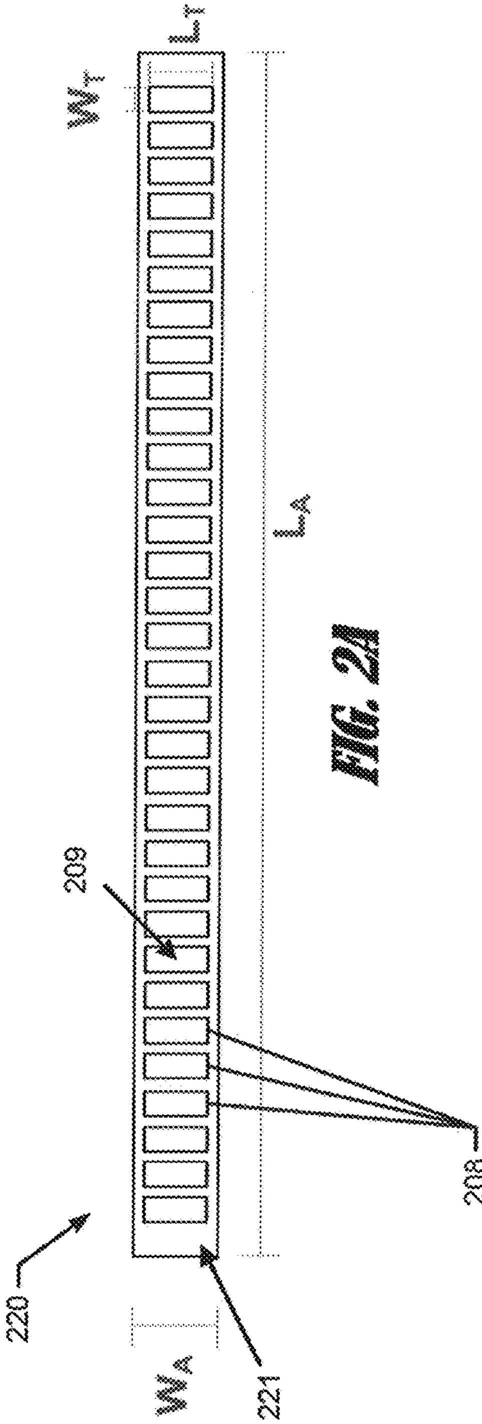
Figure 2B:
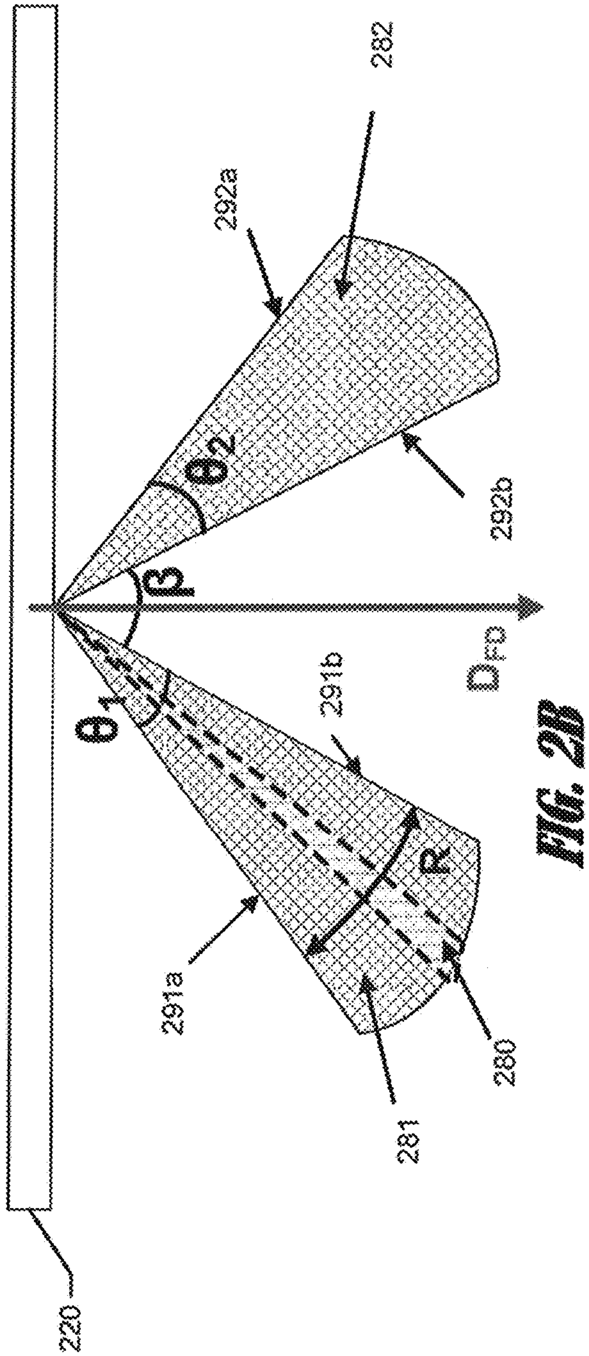
Figure 2C:
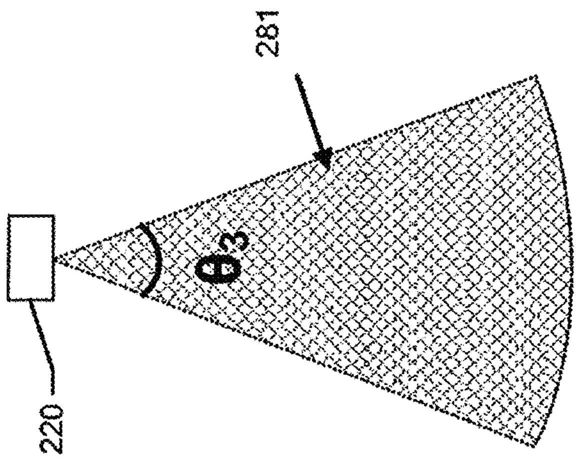
Figure 3:
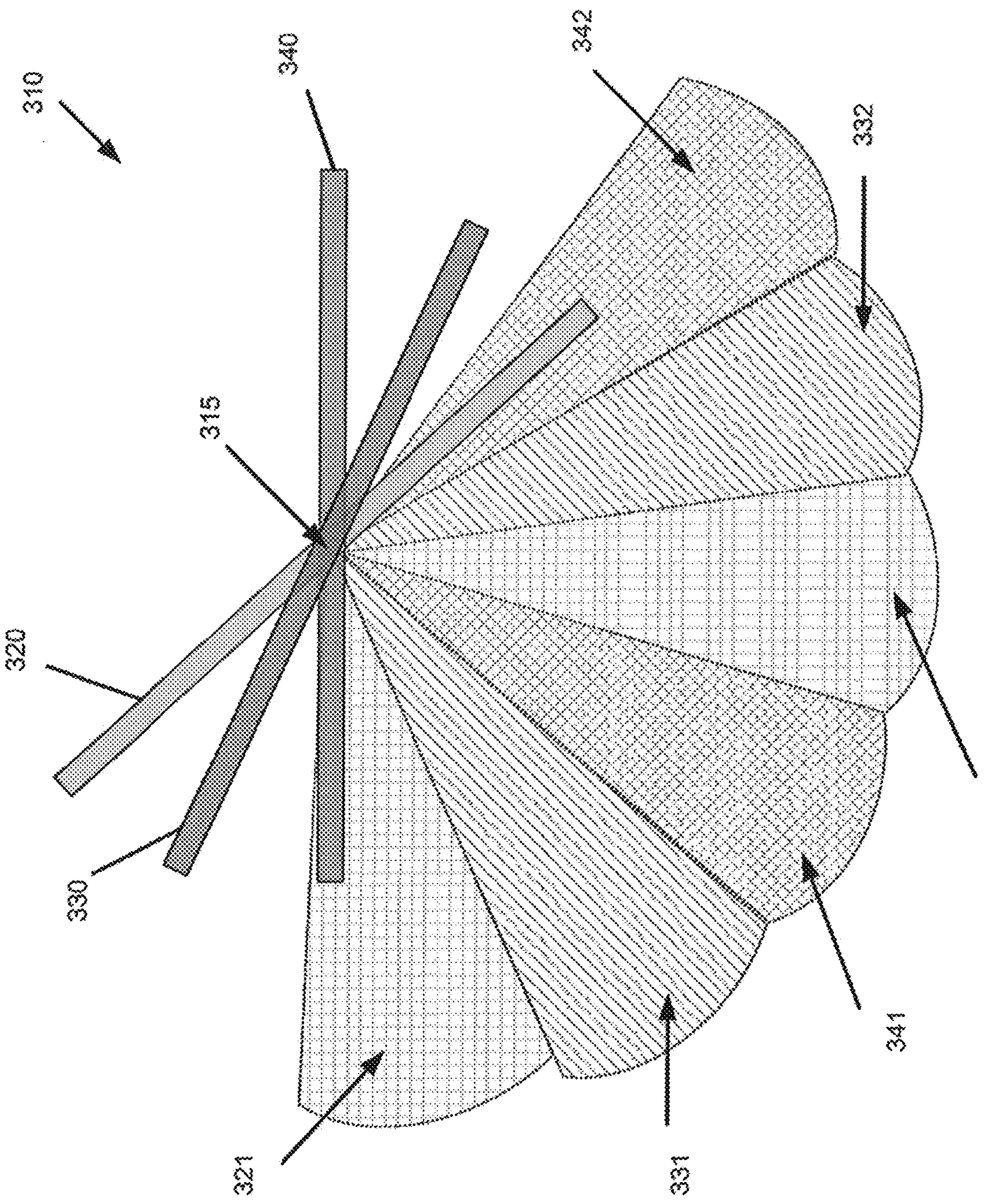
Figure 3A:
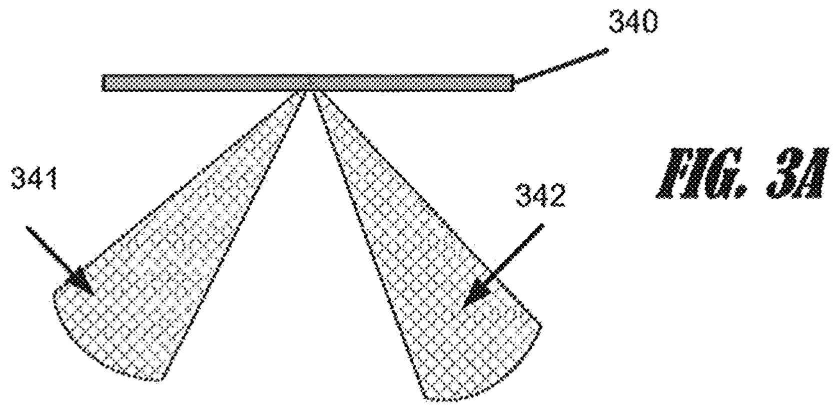
Figure 3B:
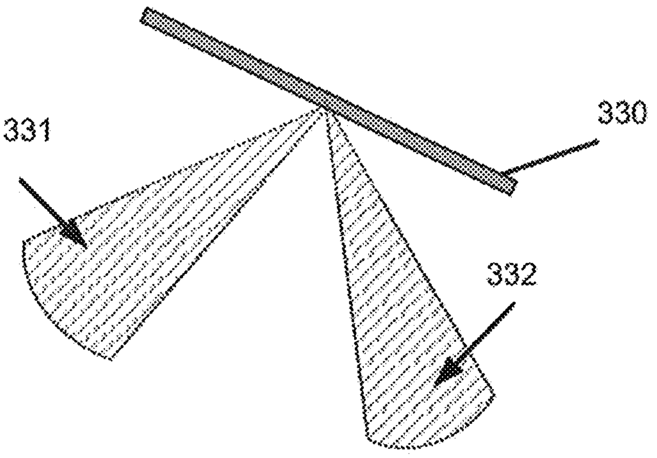
Figure 3C:
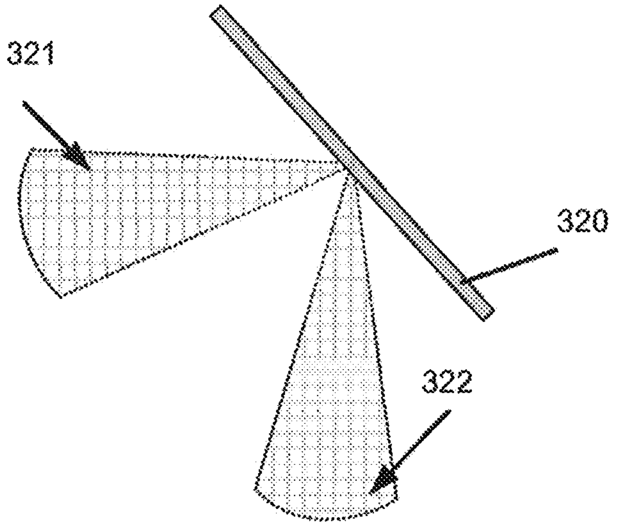
Figure 4:
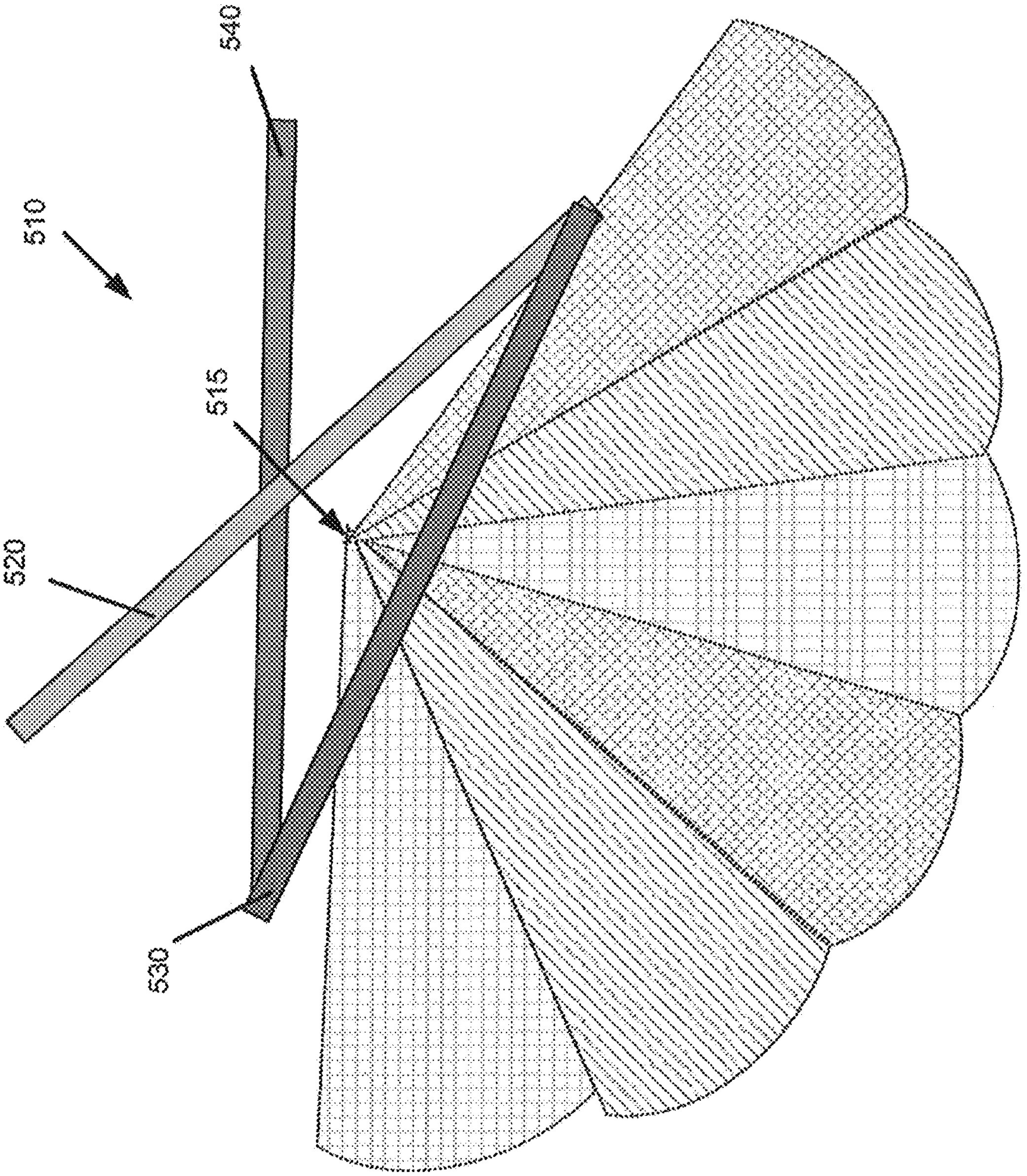
Figure 5:
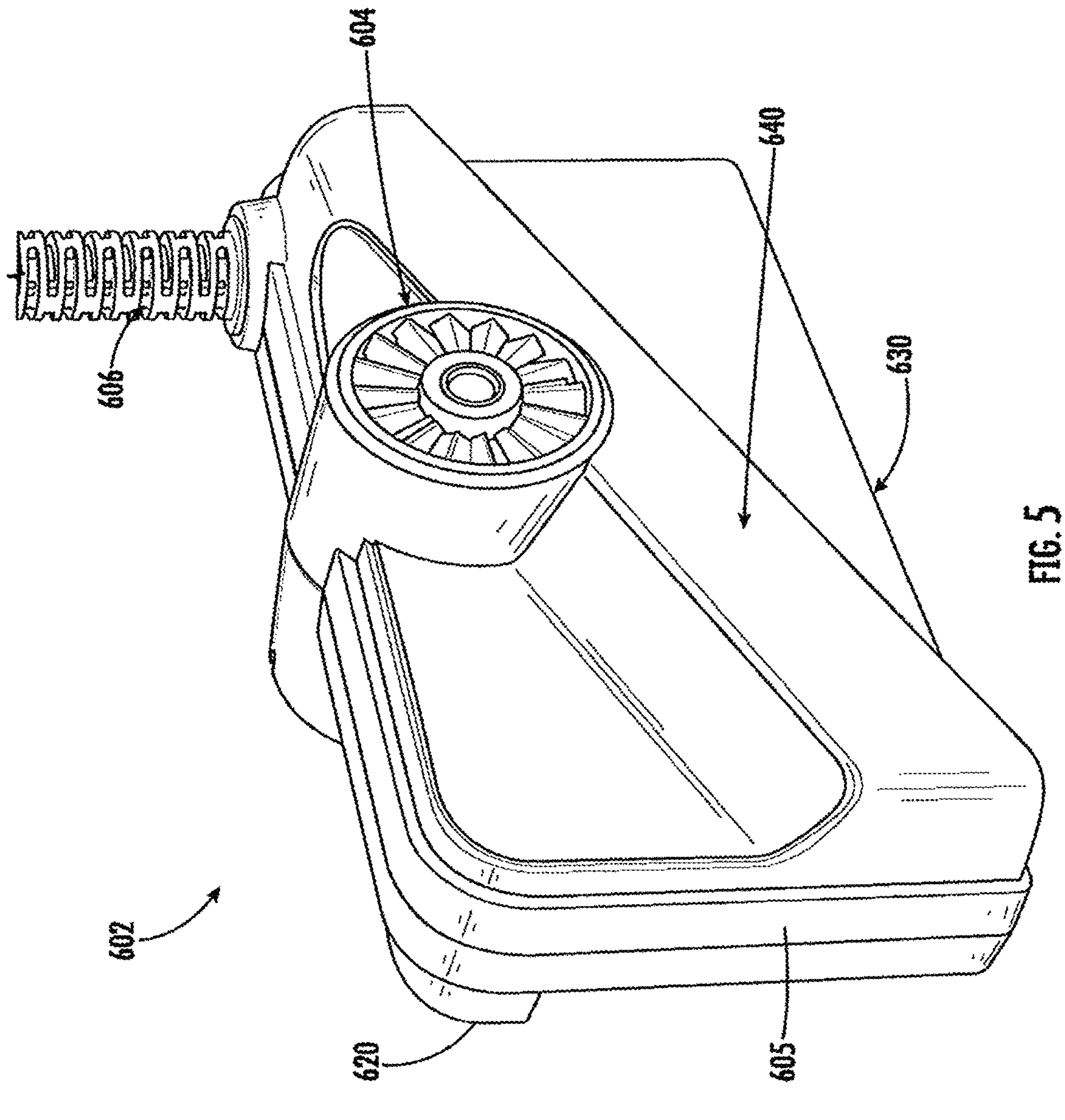
Figure 6:
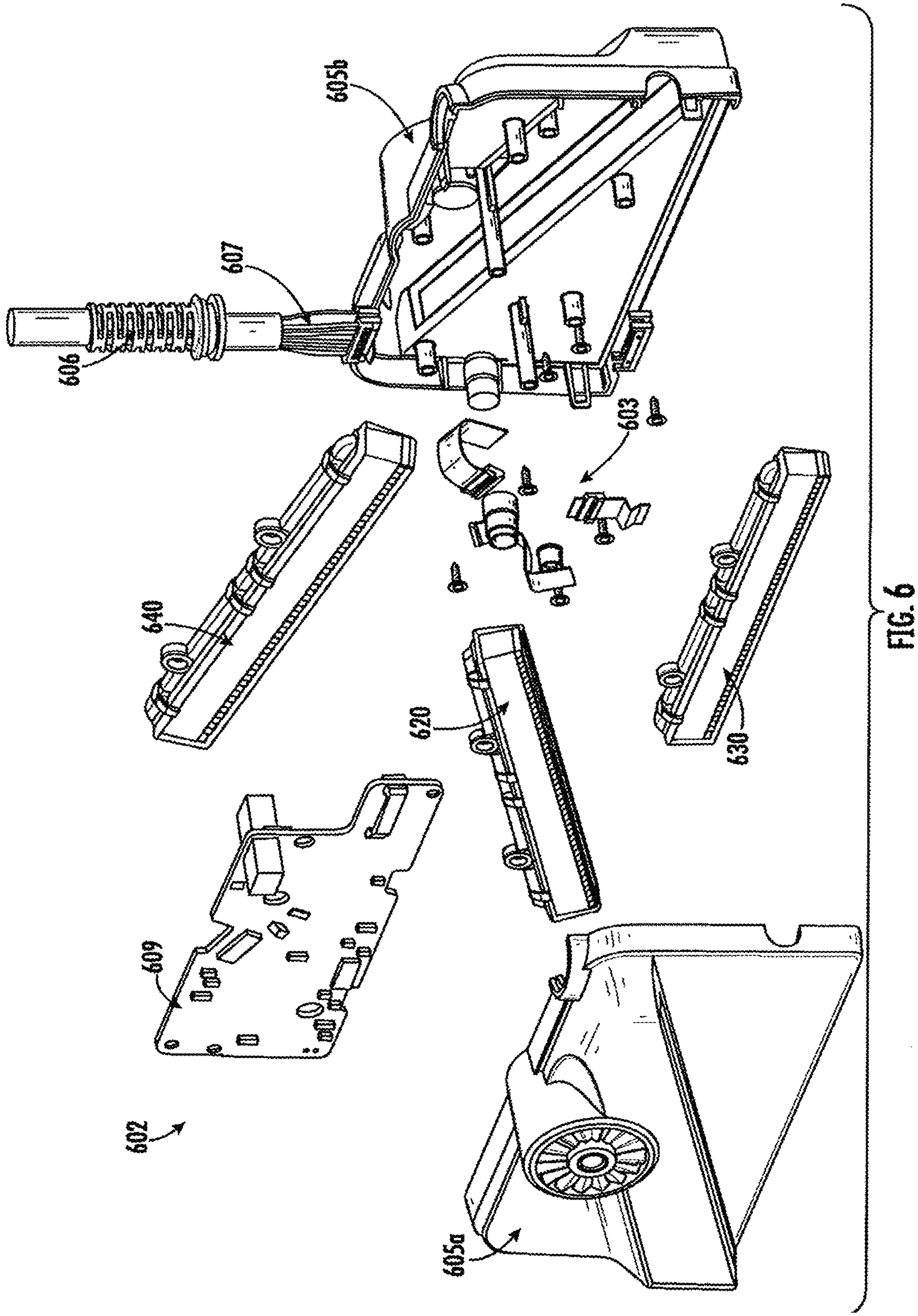
Figure 7:
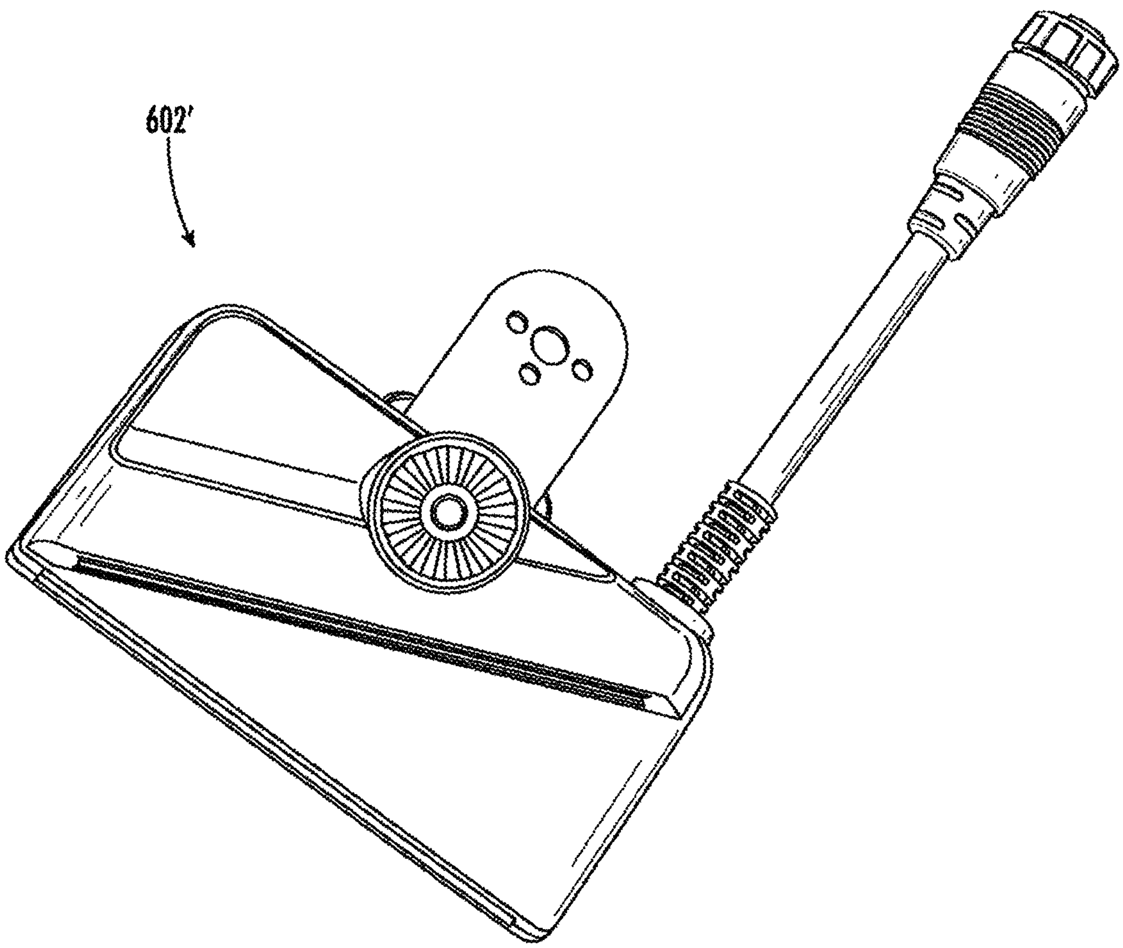
Figure 8:
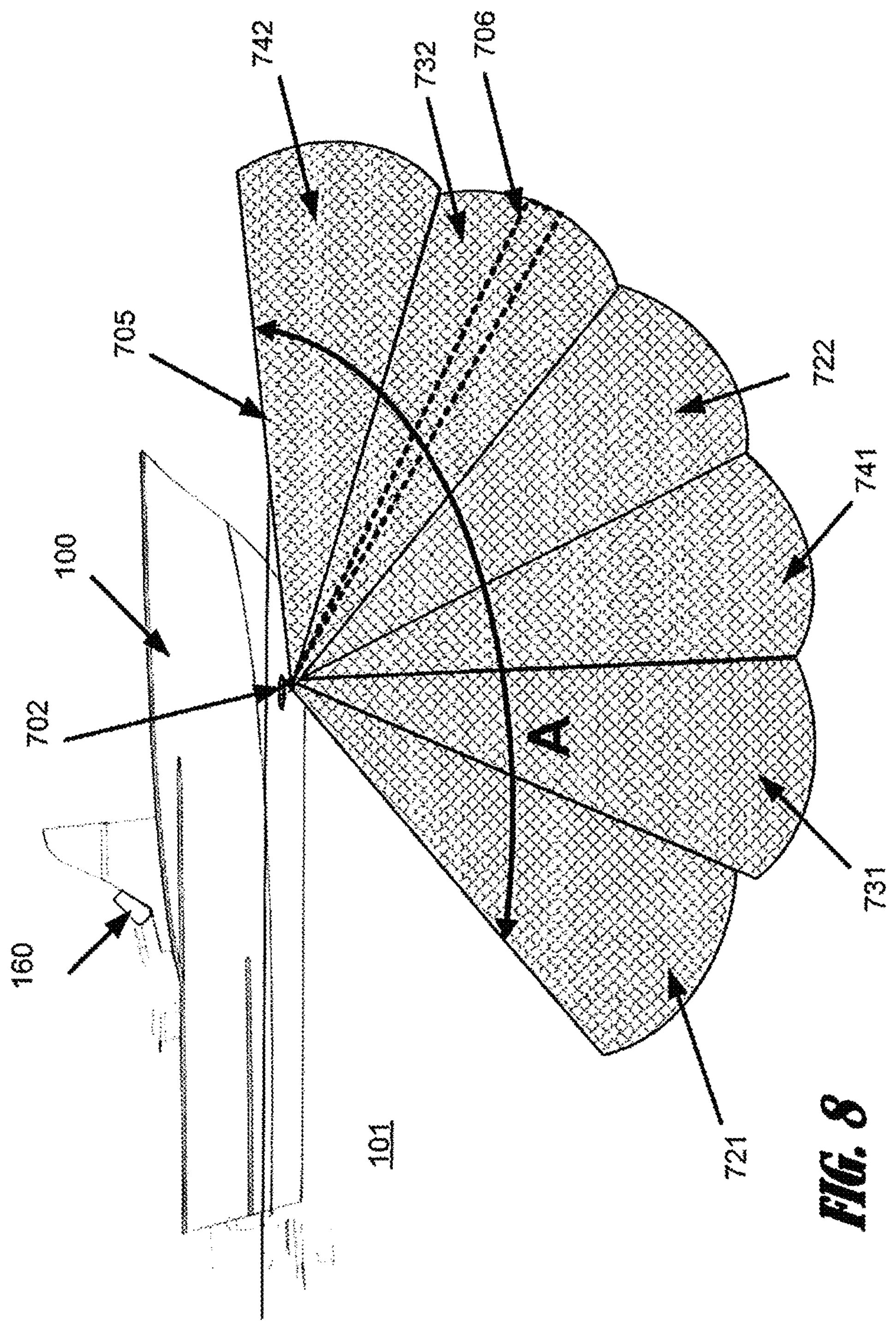
Figure 9:
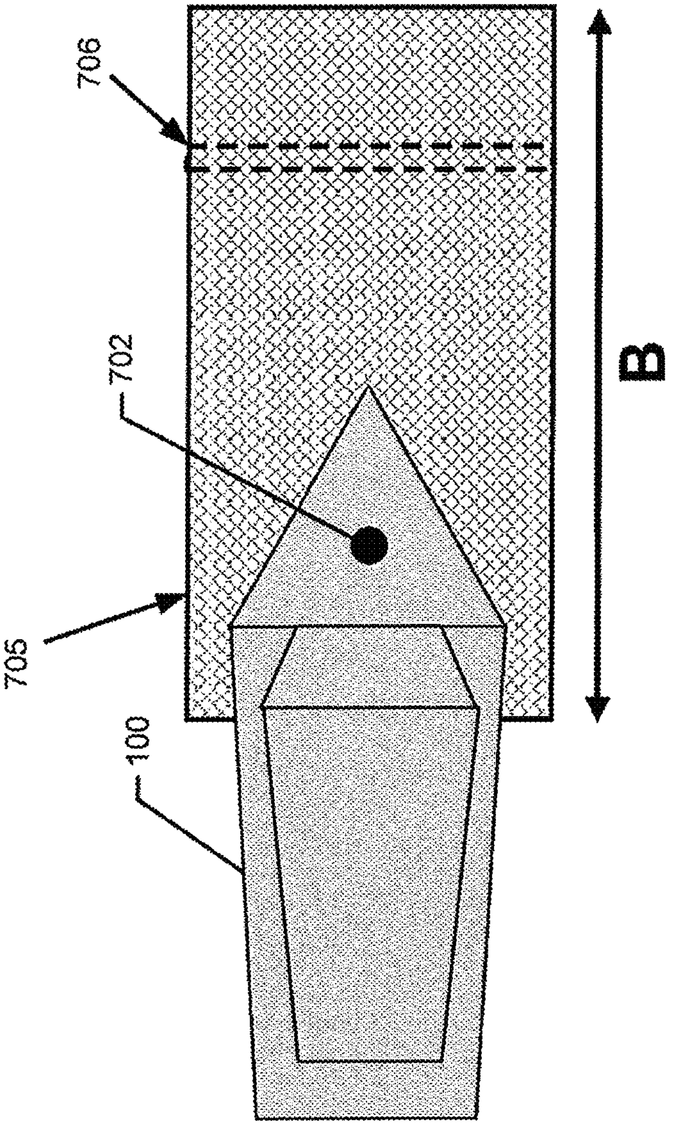
Figure 10:
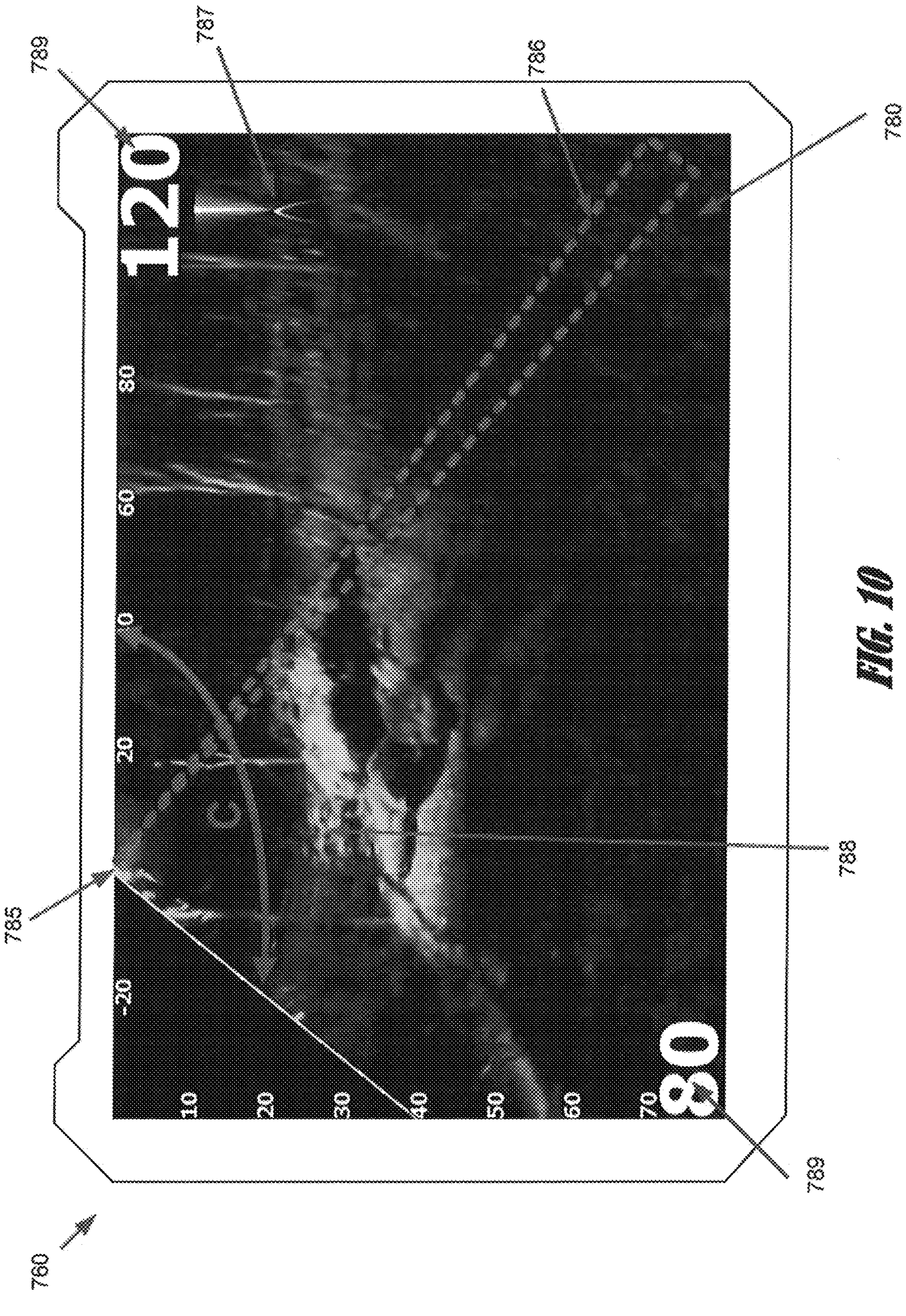
Figure 11:
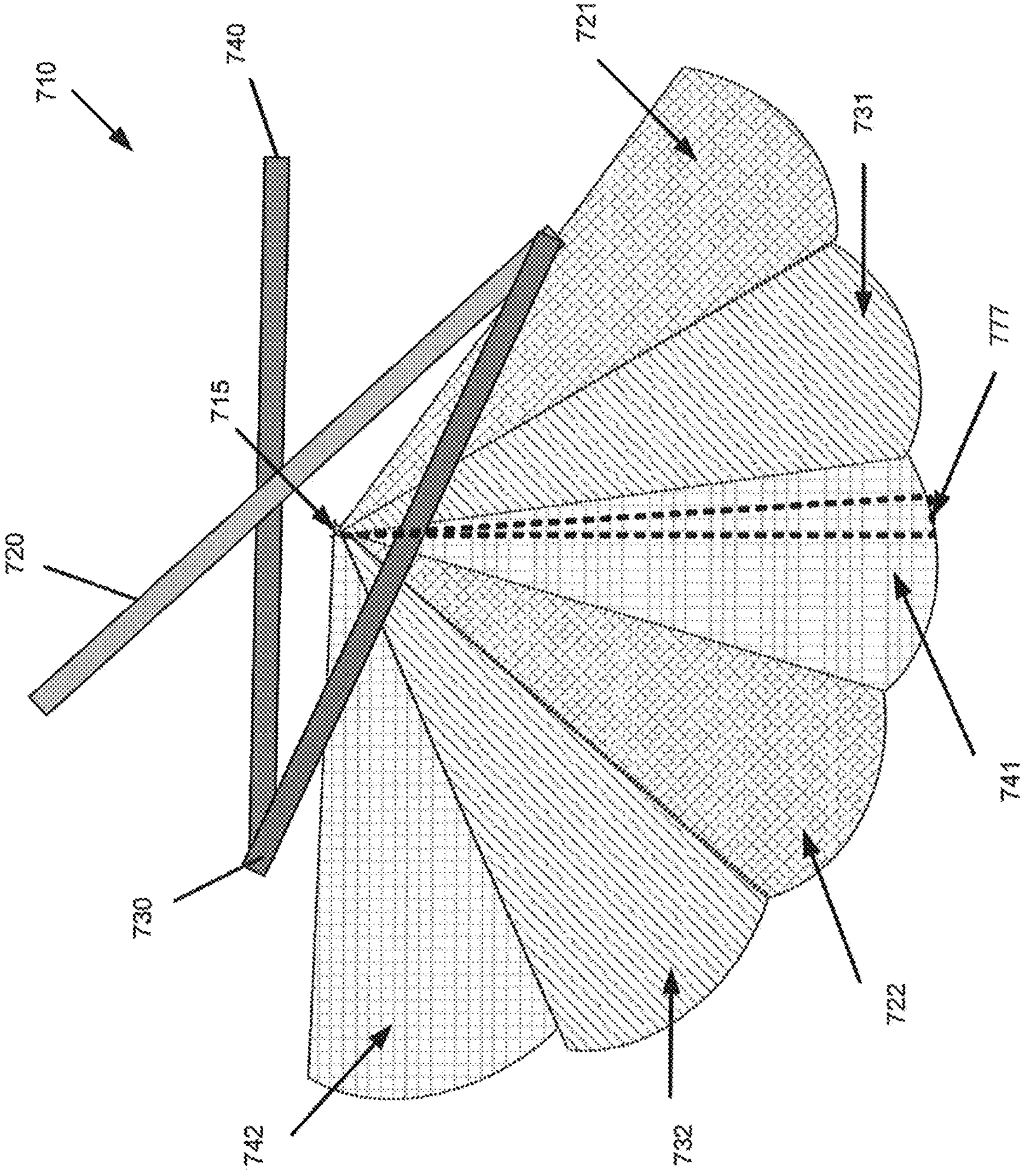
Figure 12:
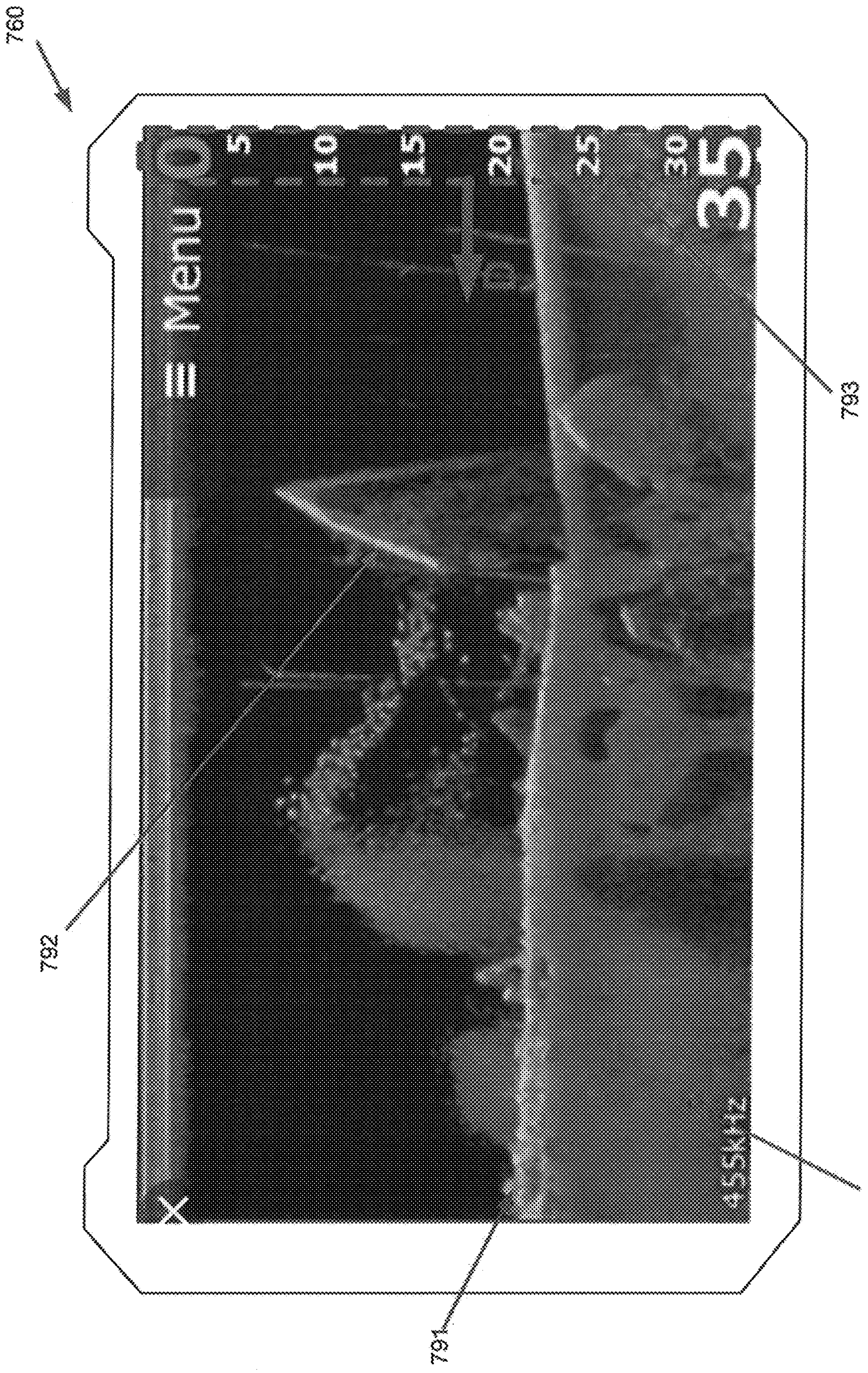
Figure 13:
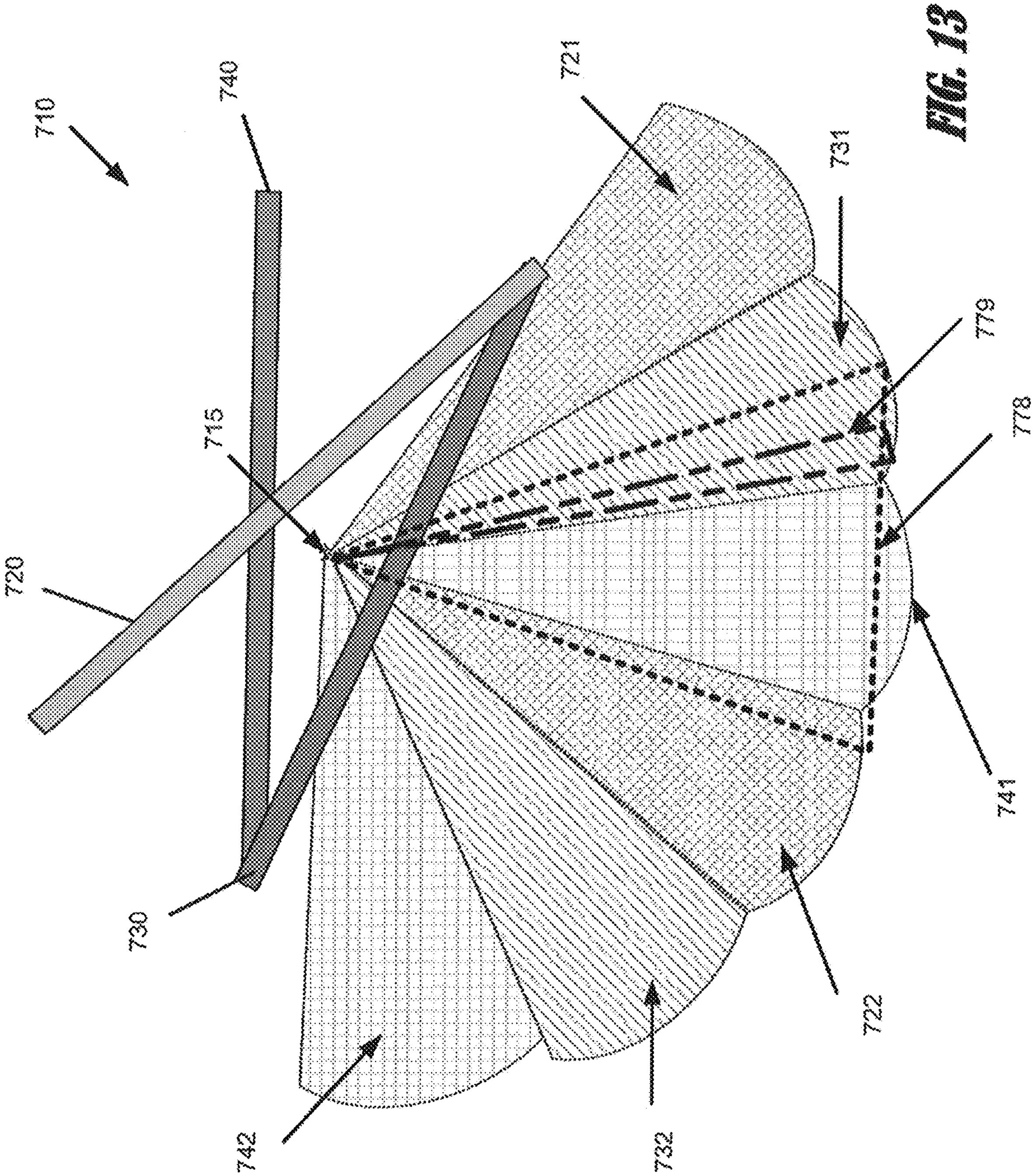
Figure 14:
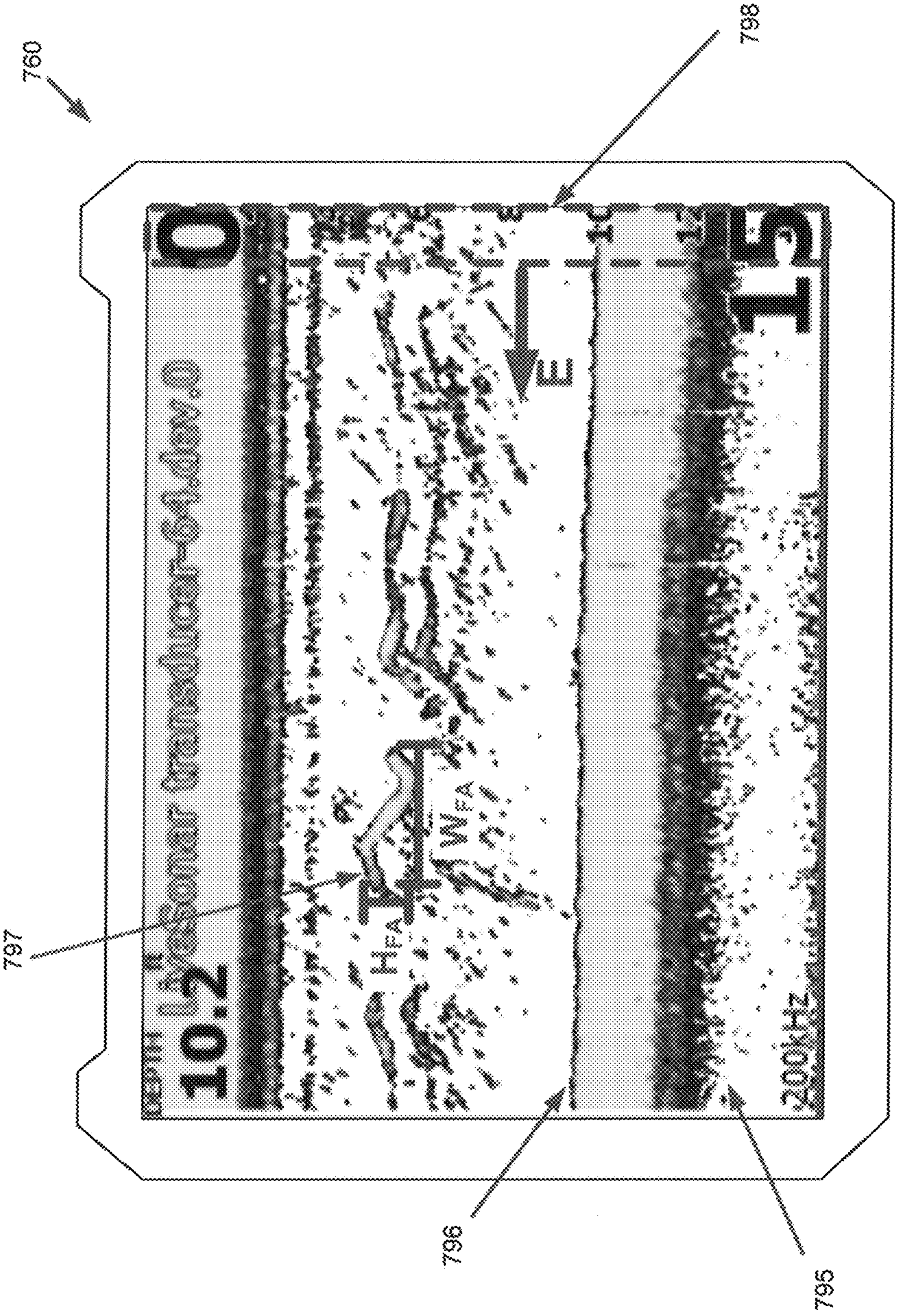
Figure 15:
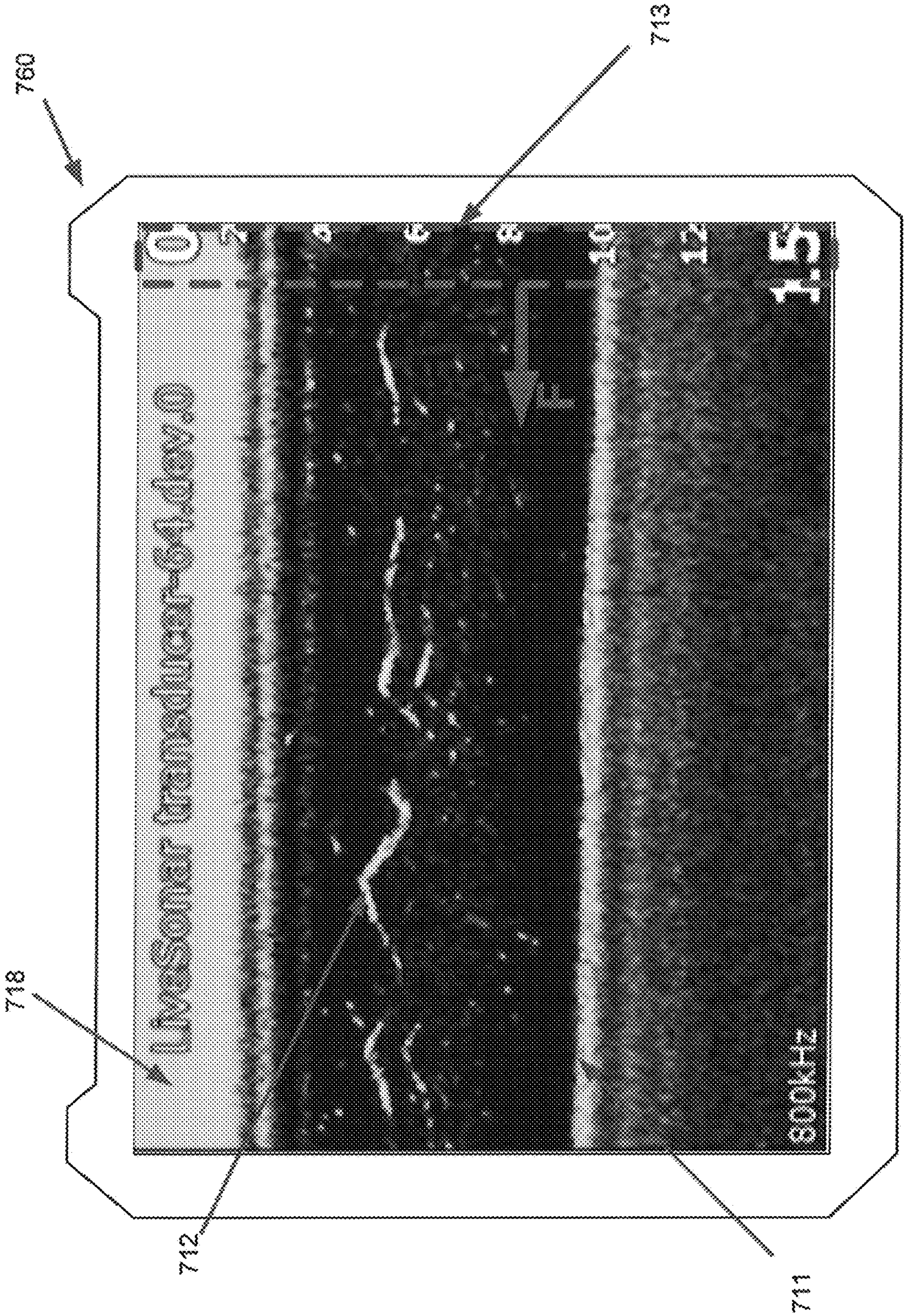
Figure 15A:
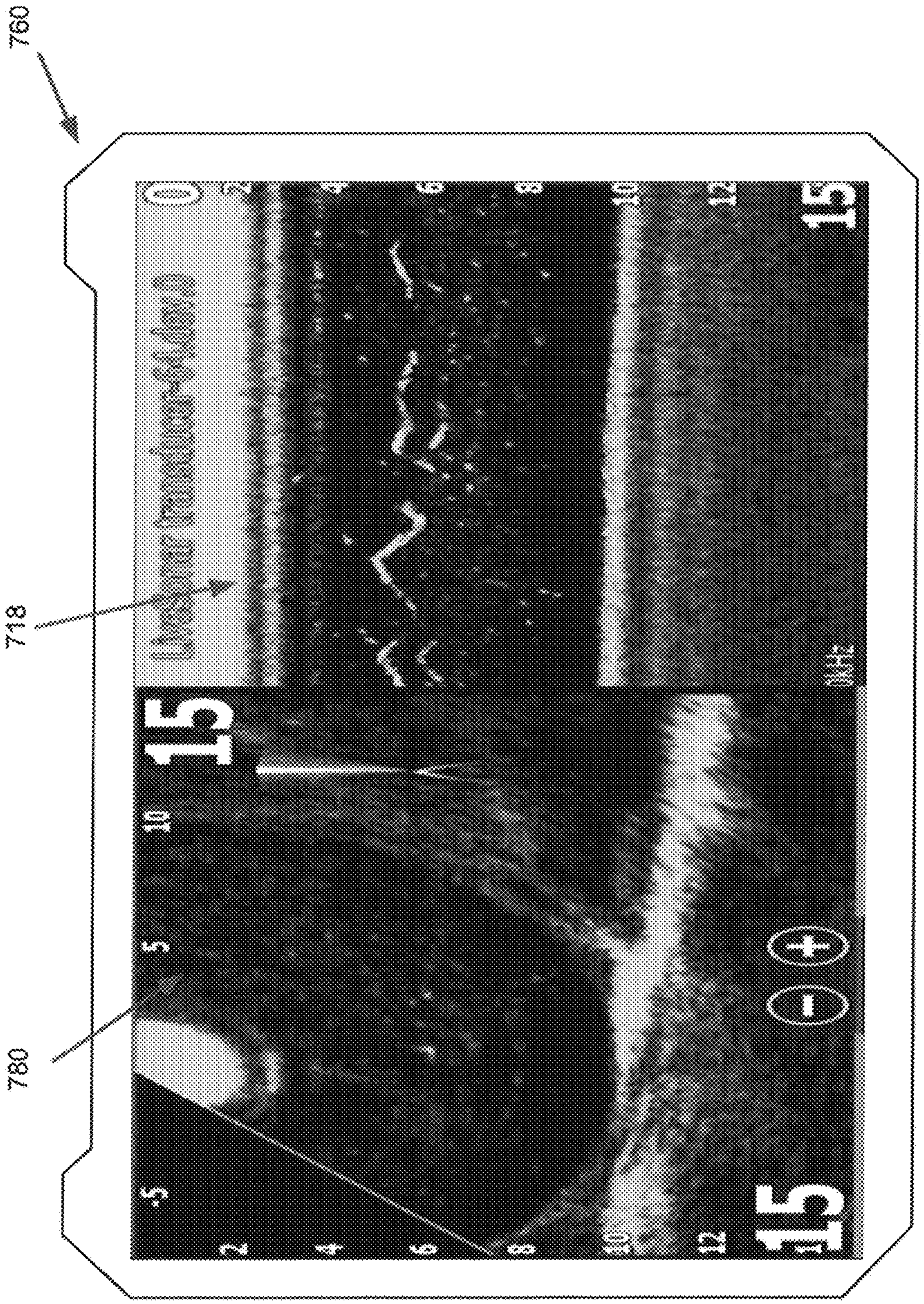
Figure 16A:
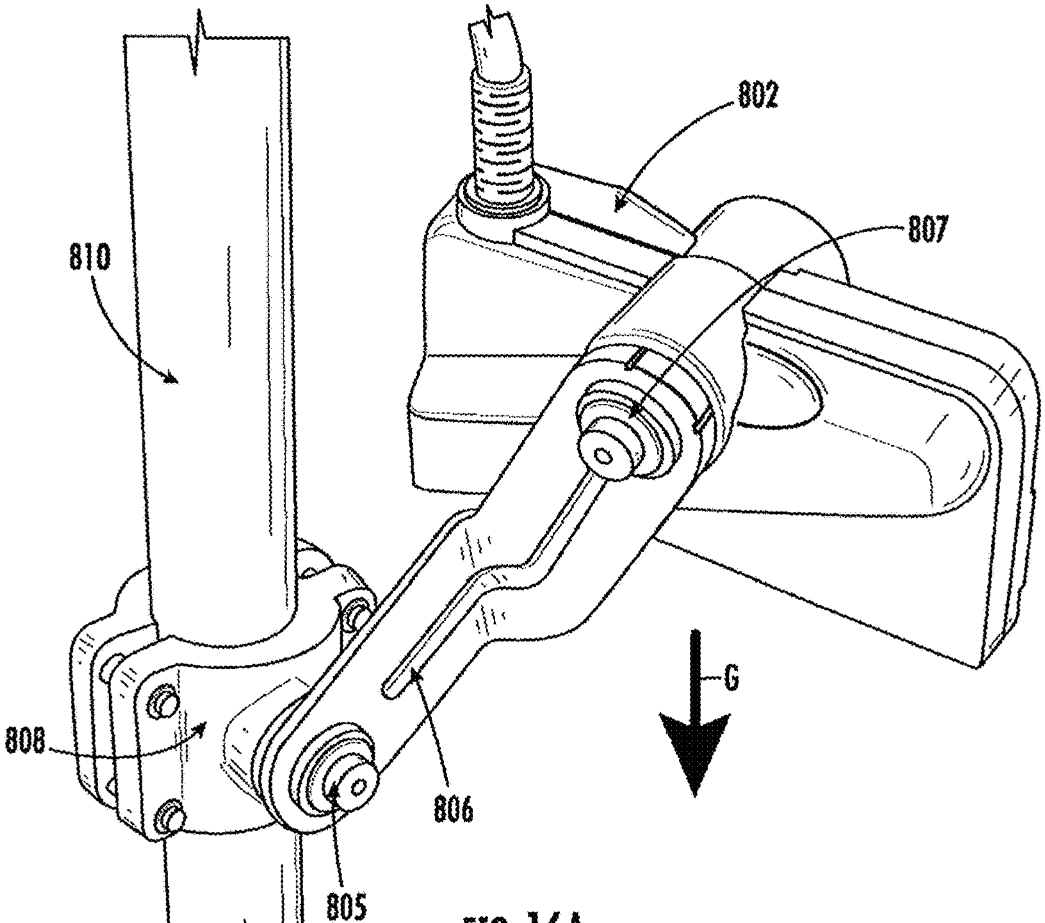
Figure 16B:
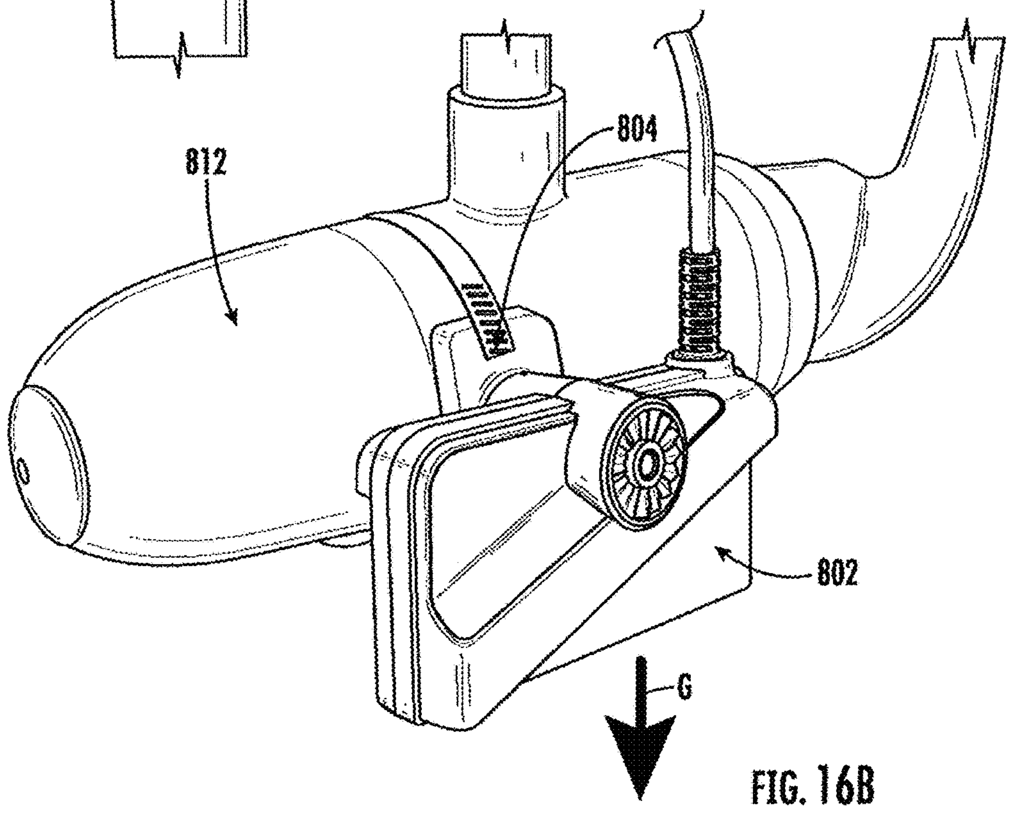
Figure 17:
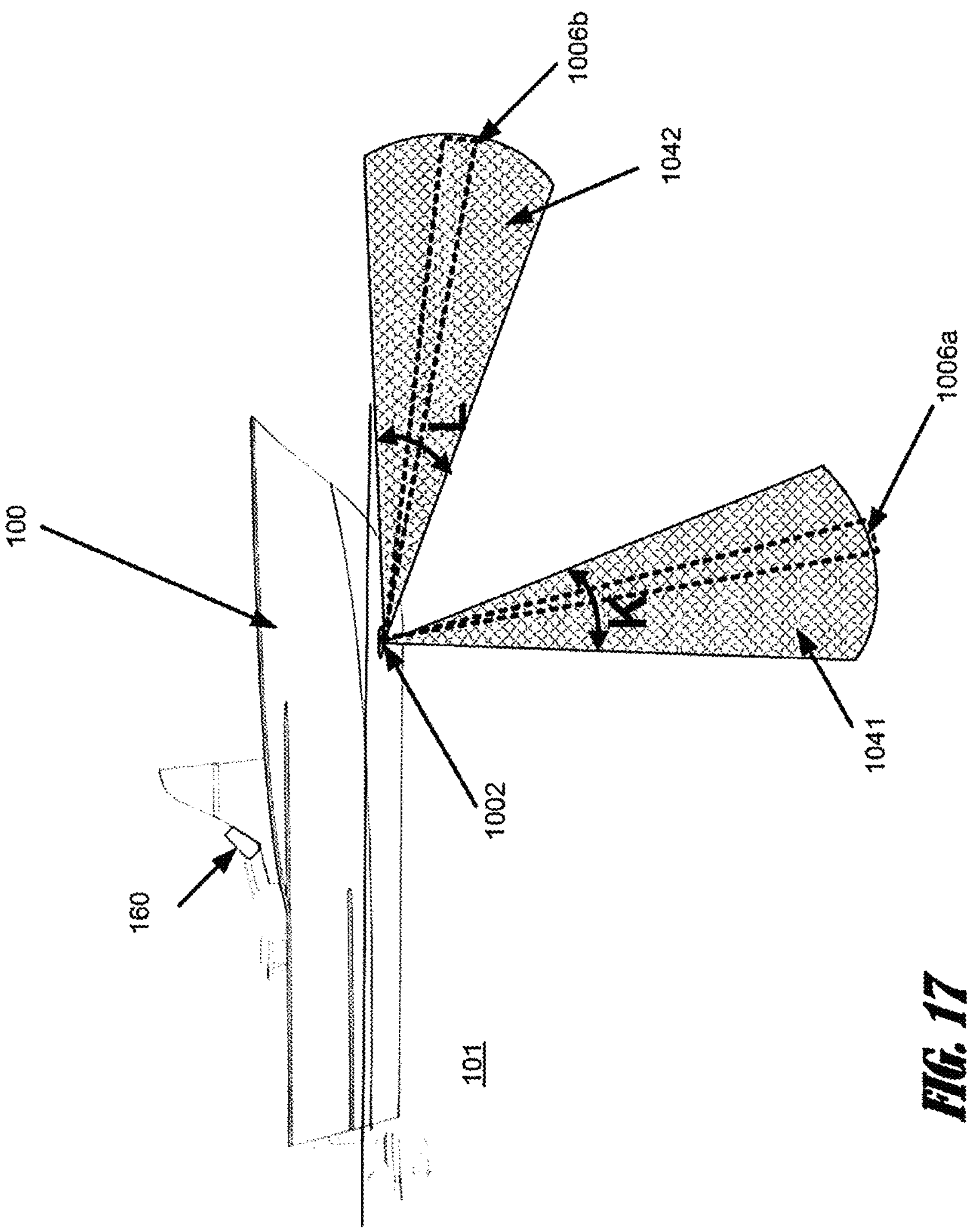
Figure 18:
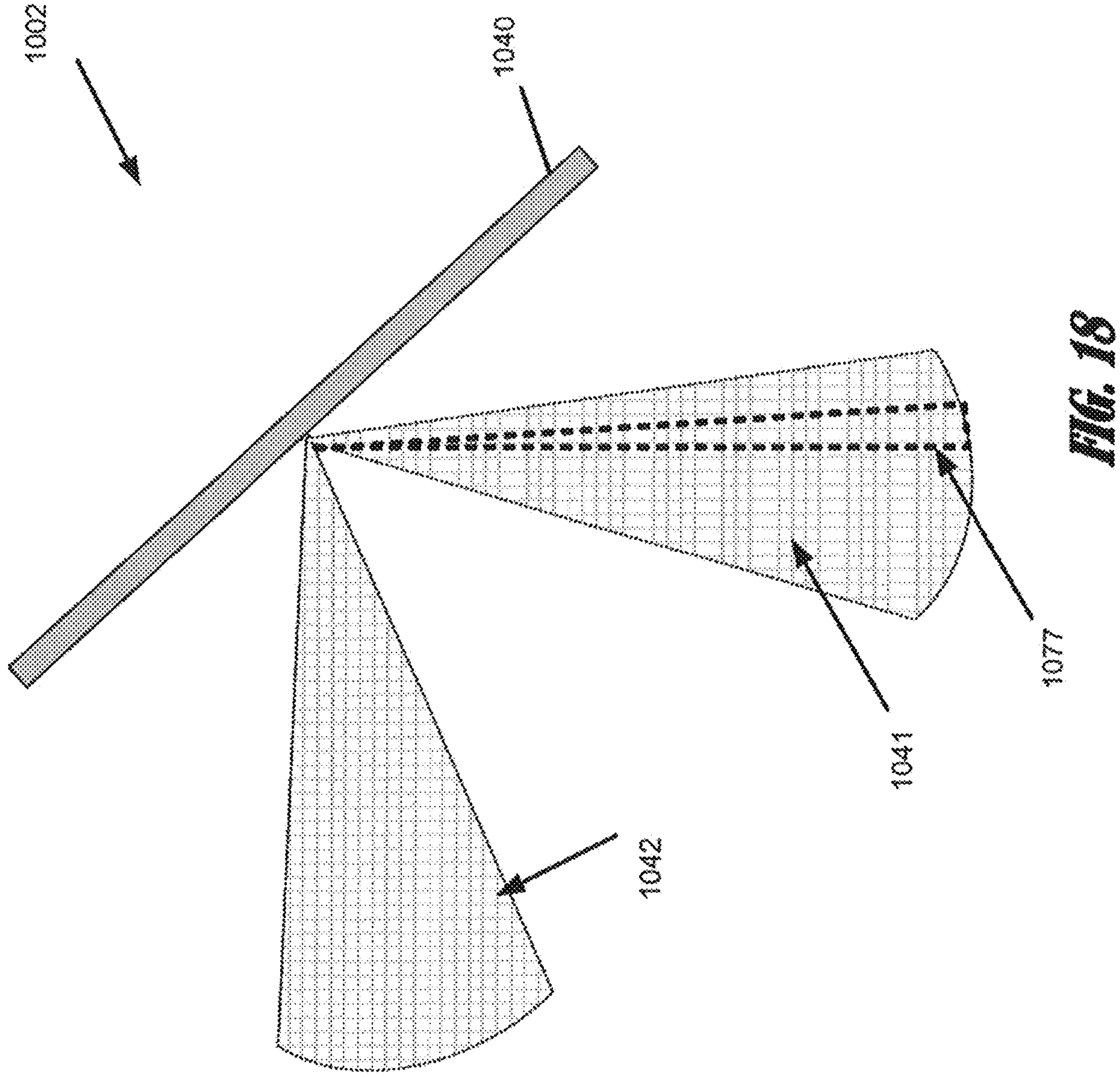
Figure 19:
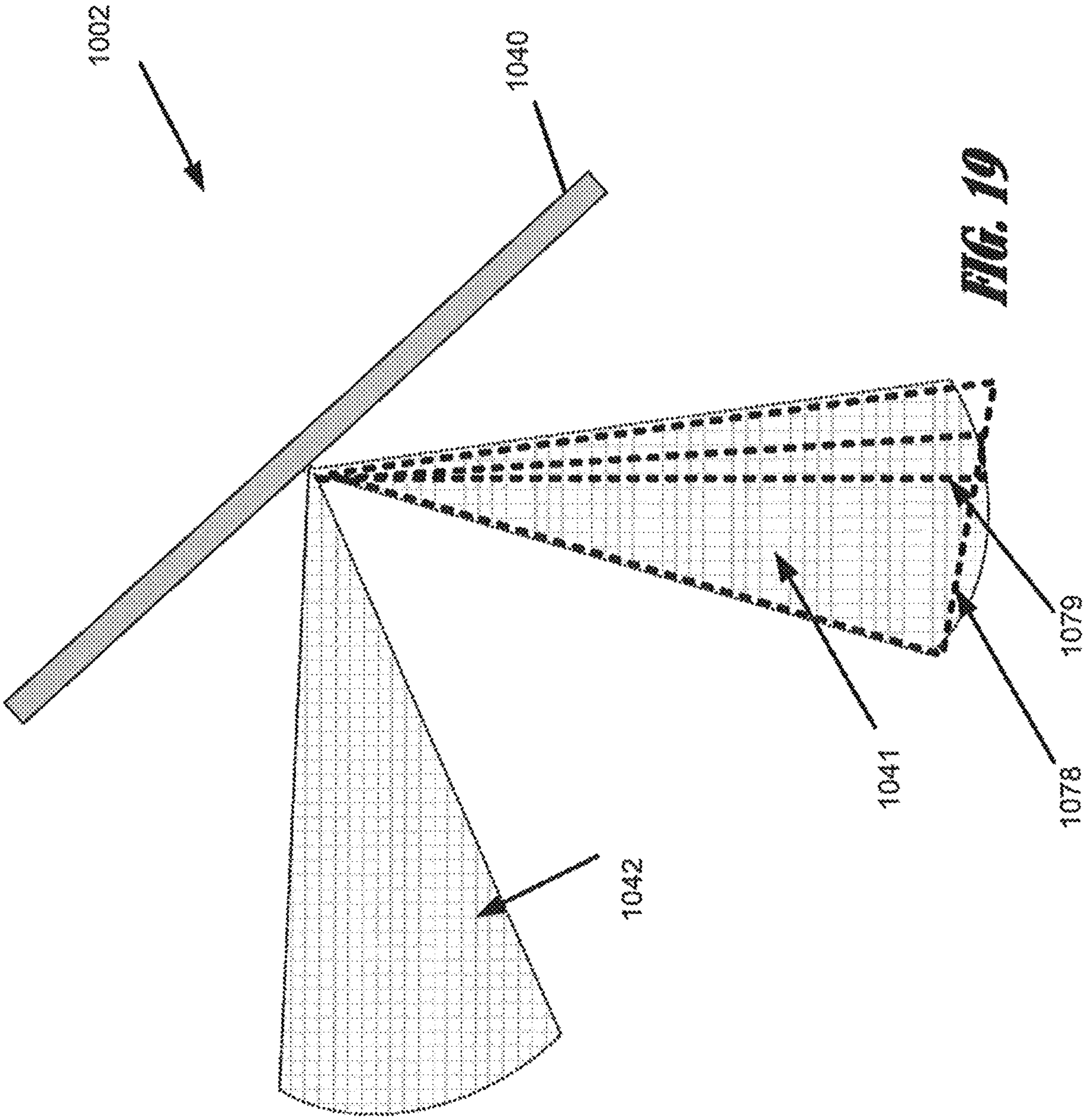
Figure 20:
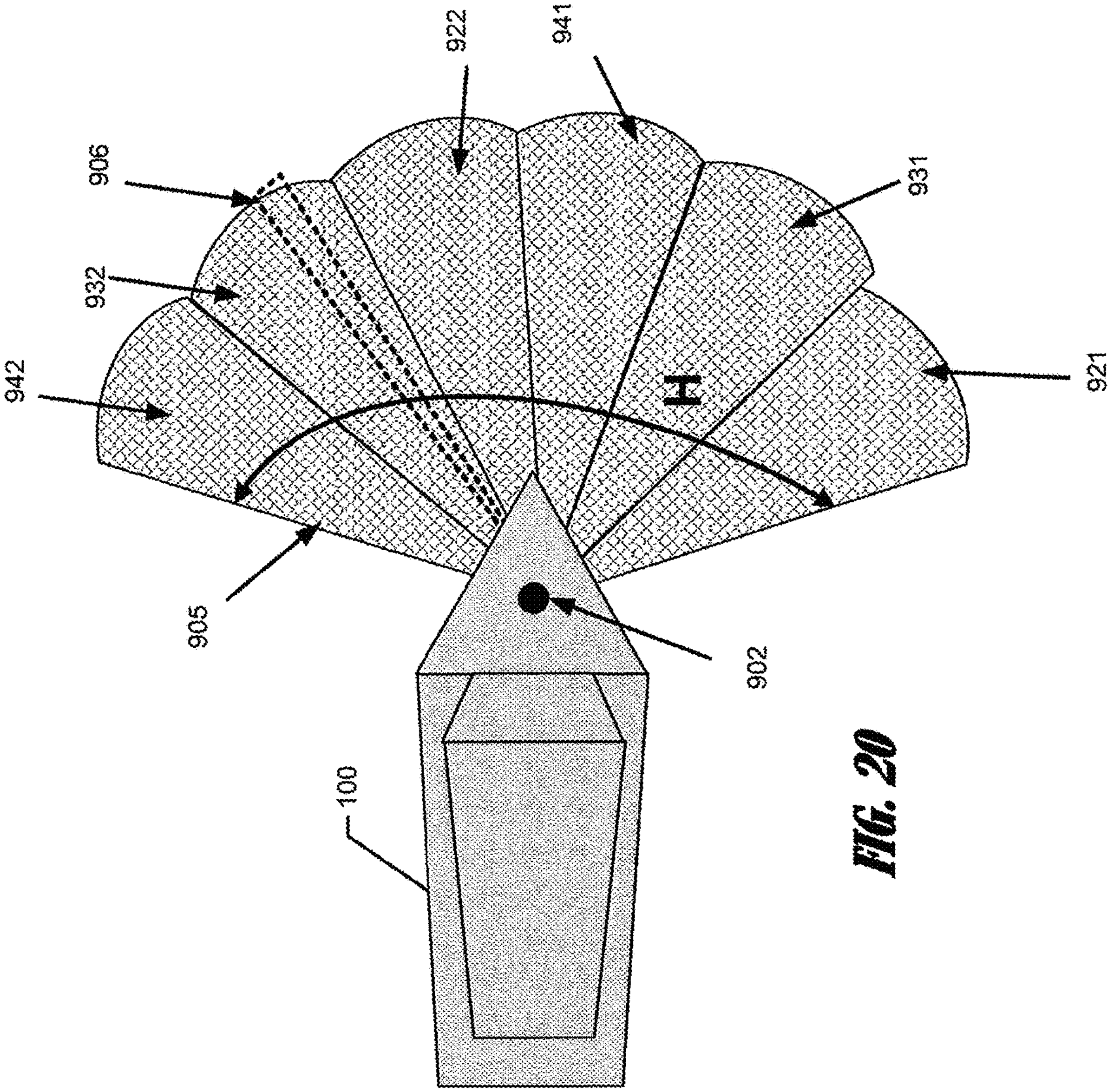
Figure 20A:
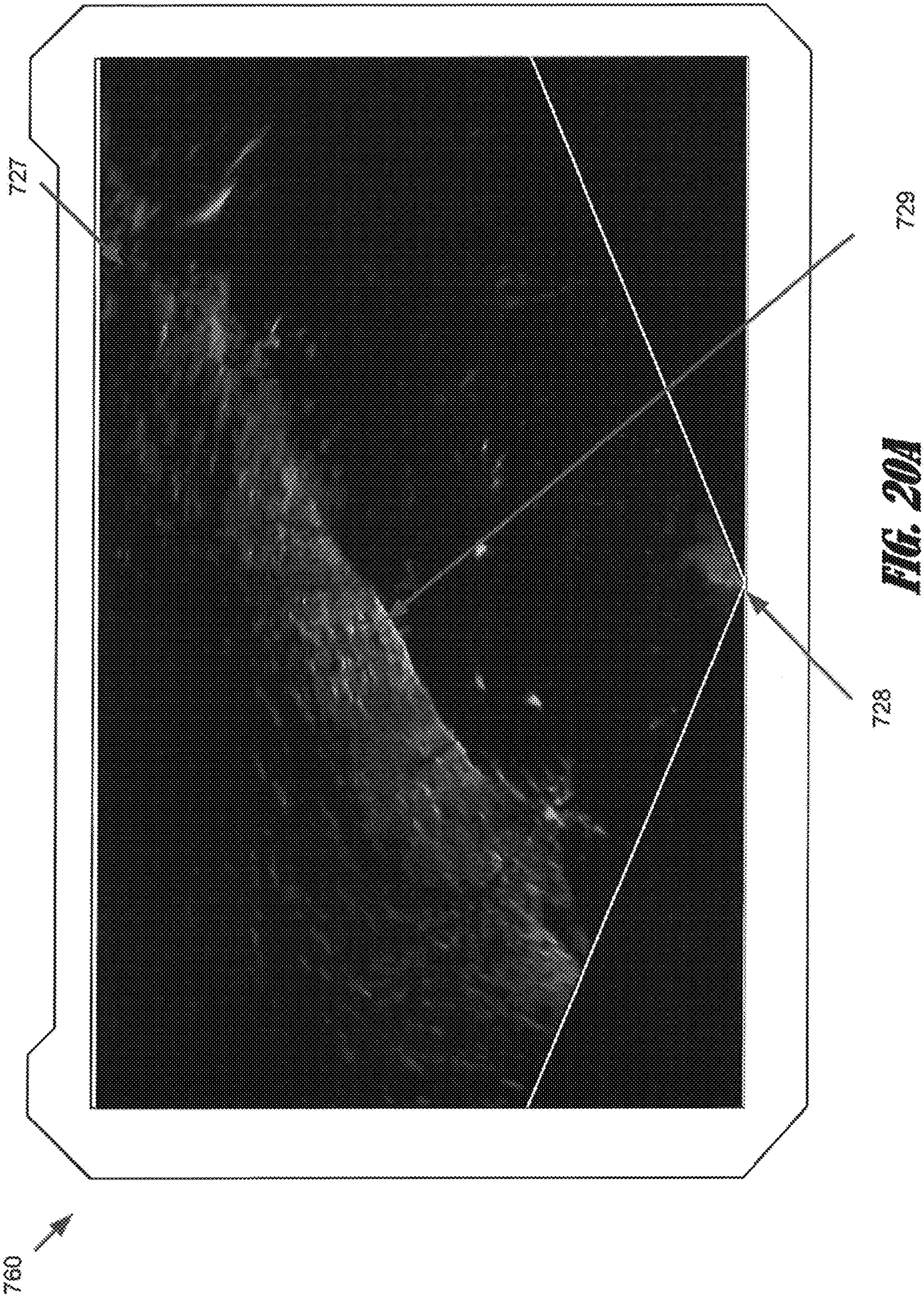
Figure 21A:
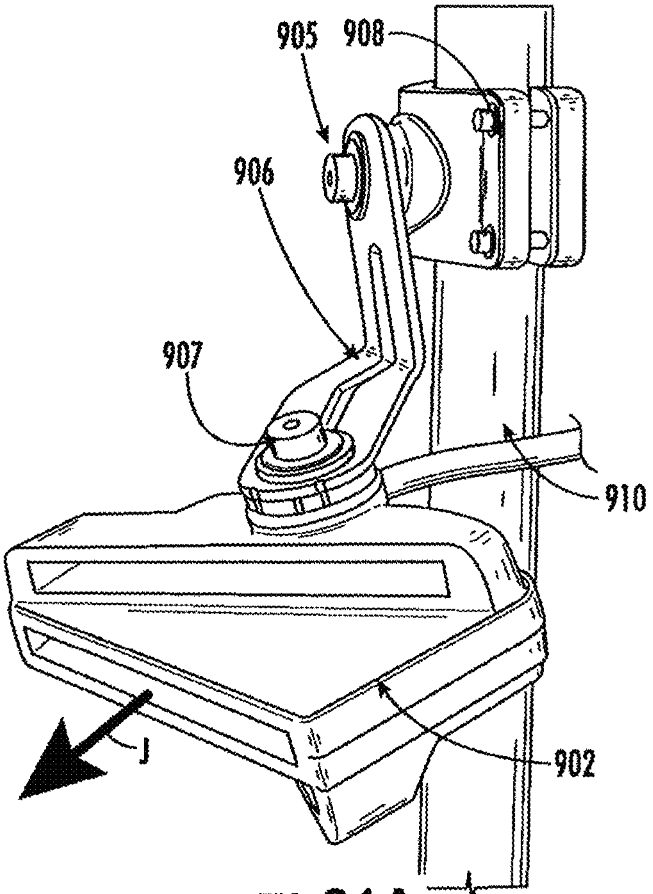
Figure 21B:
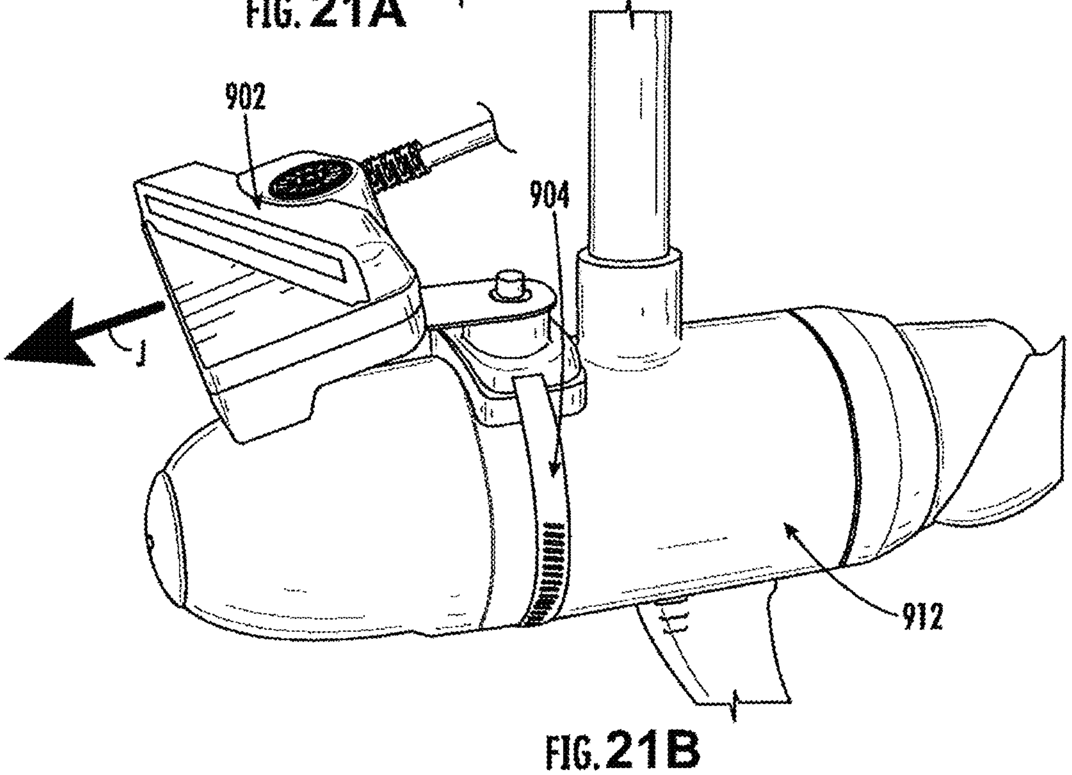
Figure 22:
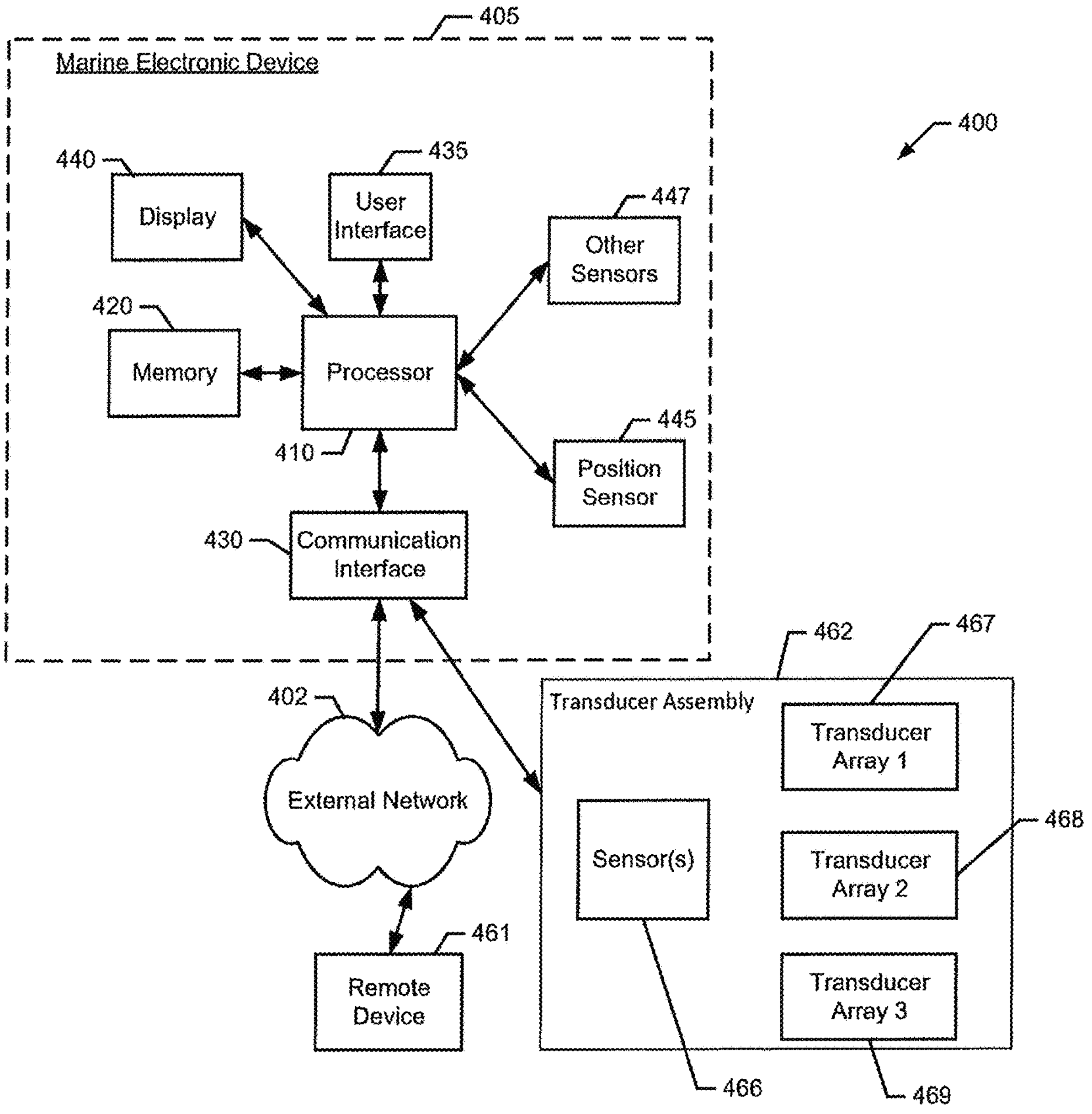
Figure 23:
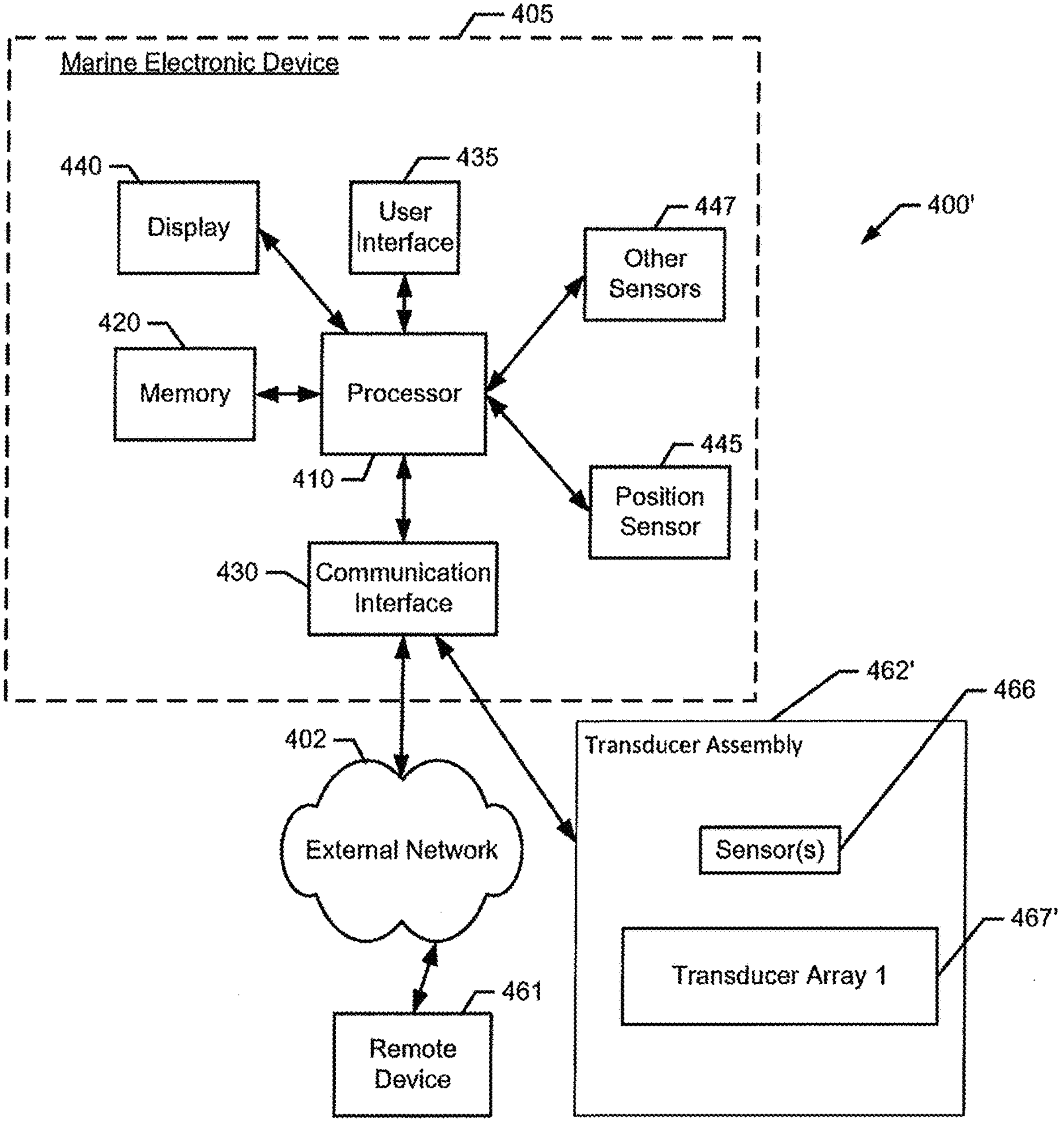
Figure 24:
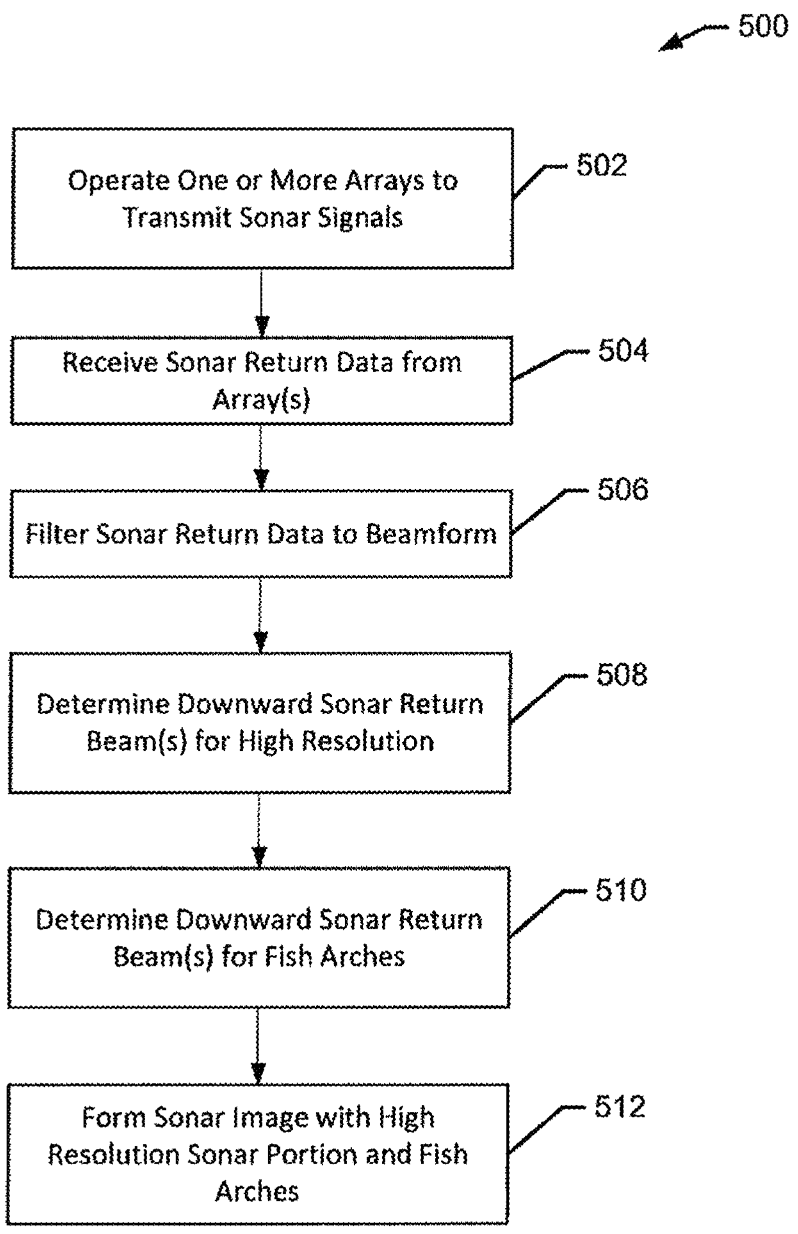
Figure 25:
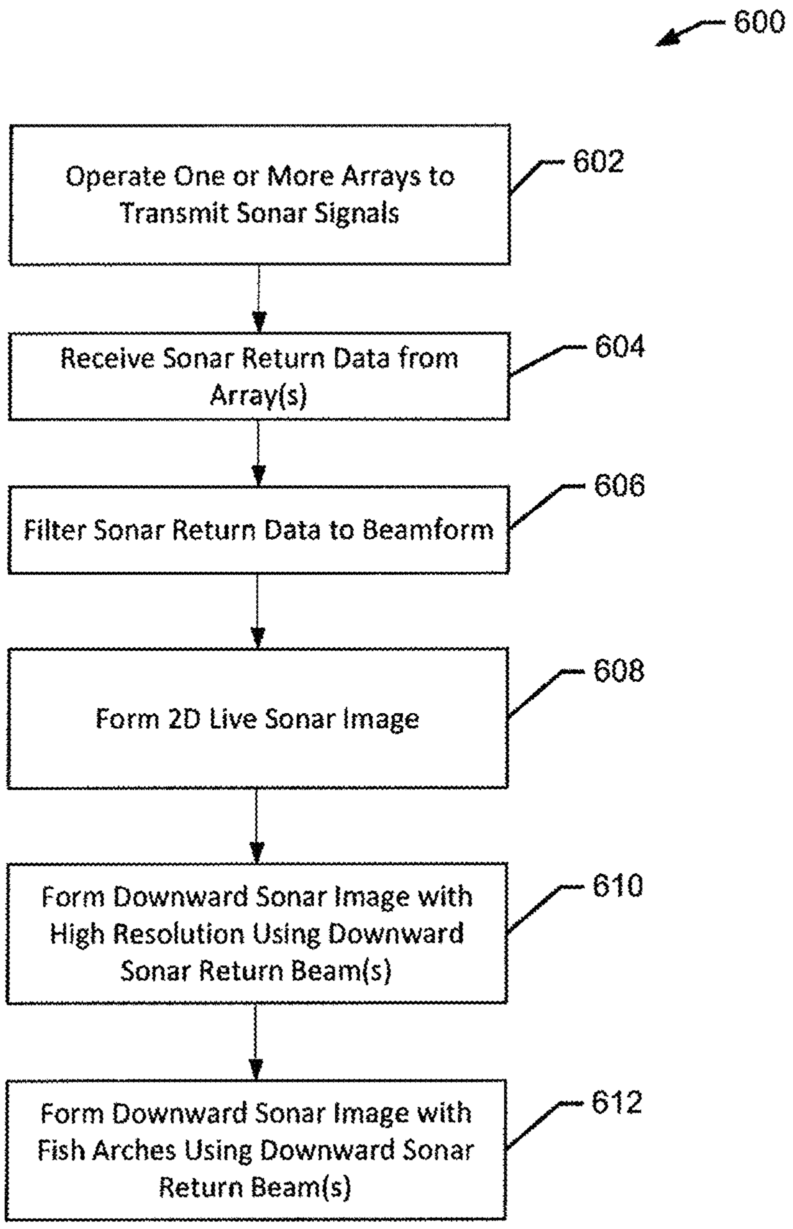

Having thus described the invention in general terms, reference will now be made to the accompanying drawings, which are not necessarily drawn to scale, and wherein:

FIG. 1 illustrates an example watercraft including various sonar transducer assemblies, in accordance with some embodiments discussed herein;

FIG. 2A illustrates an example array of transducer elements, in accordance with some embodiments discussed herein;

FIG. 2B illustrates a side view of the array of transducer elements shown in FIG. 2A, wherein an example first range of angles and an example second range of angles for beamformed sonar return beams are illustrated, in accordance with some embodiments discussed herein;

FIG. 2C illustrates an end view of the array of transducer elements shown in FIG. 2B along with illustrated ranges of angles of beamformed sonar return beams, in accordance with some embodiments discussed herein;

FIG. 3 illustrates three example arrays arranged to provide continuous sonar coverage utilizing beamformed sonar return beams, in accordance with some embodiments discussed herein;

FIG. 3A illustrates a first array shown in FIG. 3 along with its corresponding ranges of angles of beamformed sonar return beams, in accordance with some embodiments discussed herein;

FIG. 3B illustrates a second array shown in FIG. 3 along with its corresponding ranges of angles of beamformed sonar return beams, in accordance with some embodiments discussed herein;

FIG. 3C illustrates a third array shown in FIG. 3 along with its corresponding ranges of angles of beamformed sonar return beams, in accordance with some embodiments discussed herein;

FIG. 4 illustrates another example arrangement of three example arrays arranged to provide continuous sonar coverage utilizing beamformed sonar return beams, in accordance with some embodiments discussed herein;

FIG. 5 shows a perspective view of an example transducer assembly that includes three arrays, in accordance with some embodiments discussed herein;

FIG. 6 shows an exploded view of the example transducer assembly shown in FIG. 5, in accordance with some embodiments discussed herein;

FIG. 7 shows a bottom perspective view of another example transducer assembly that includes three arrays, in accordance with some embodiments discussed herein;

FIG. 8 illustrates a watercraft with an example transducer assembly utilizing three arrays to provide continuous sonar coverage, in accordance with some embodiments discussed herein;

FIG. 9 illustrates a schematic top plan view of the watercraft and sonar coverage shown in FIG. 8, in accordance with some embodiments discussed herein;

FIG. 10 shows an example marine electronic device presenting a two-dimensional (2D) live sonar image corresponding to the sonar coverage shown in FIG. 8, in accordance with some embodiments discussed herein;

FIG. 11 illustrates the arrangement of three example arrays shown in FIG. 4, wherein a downward sonar return beam is indicated, in accordance with some embodiments discussed herein;

FIG. 12 shows an example marine electronic device presenting a downward sonar image with high resolution, wherein the sonar image is formed from sonar return data from the downward sonar return beam indicated in FIG. 11, in accordance with some embodiments discussed herein;

FIG. 13 illustrates the arrangement of three example arrays shown in FIG. 4, wherein multiple sonar return beams are indicated, in accordance with some embodiments discussed herein;

FIG. 14 shows an example marine electronic device presenting a downward sonar image with fish arches, wherein the sonar image is formed from sonar return data from the multiple sonar return beams indicated in FIG. 13, in accordance with some embodiments discussed herein;

FIG. 15 shows an example marine electronic device presenting a downward sonar image with high resolution surface features and fish arches, wherein the sonar image is formed from sonar return data from both the one downward sonar return beam indicated in FIG. 11 and the multiple sonar return beams indicated in FIG. 13, in accordance with some embodiments discussed herein;

FIG. 15A shows an example marine electronic device presenting a split screen of a two-dimensional (2D) live sonar image and a downward sonar image with high resolution surface features and fish arches, in accordance with some embodiments discussed herein;

FIGS. 16A-B illustrate example mounting options for the example transducer assembly of FIG. 5 when mounted generally vertically, in accordance with some embodiments discussed herein;

FIG. 17 illustrates a watercraft with an example transducer assembly utilizing a single array to provide sonar coverage, in accordance with some embodiments discussed herein;

FIG. 18 illustrates the arrangement of the single example array shown in FIG. 17, wherein a downward sonar return beam is indicated, in accordance with some embodiments discussed herein;

FIG. 19 illustrates the arrangement of the single example array shown in FIG. 17, wherein multiple sonar return beams are indicated, in accordance with some embodiments discussed herein;

FIG. 20 illustrates a schematic top plan view of a watercraft with an example transducer assembly utilizing three arrays, wherein the transducer assembly is mounted horizontally to provide sonar coverage in the port-to-starboard direction in front of the watercraft, in accordance with some embodiments discussed herein;

FIG. 20A shows an example marine electronic device presenting a two-dimensional (2D) live sonar image corresponding to the sonar coverage shown in FIG. 20, in accordance with some embodiments discussed herein;

FIGS. 21A-B illustrate example mounting options for the example transducer assembly of FIG. 5 when mounted generally horizontally, in accordance with some embodiments discussed herein;

FIG. 22 is a block diagram of an example sonar system, in accordance with some embodiments discussed herein;

FIG. 23 is a block diagram of another example sonar system, in accordance with some embodiments discussed herein;

FIG. 24 illustrates a flowchart of an example method of operating a sonar system according to some embodiments discussed herein; and FIG. 25 illustrates a flowchart of another example method of operating a sonar system according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As depicted in FIG. 1, a watercraft 100 (e.g., a vessel) configured to traverse a marine environment, e.g. body of water 101, may use one or more sonar transducer assemblies 102*a*, 102*b*, and 102*c* disposed on and/or proximate to the watercraft. The watercraft 100 may be a surface watercraft, a submersible watercraft, or any other implementation known to those skilled in the art. The transducer assemblies 102*a*, 102*b*, and 102*c* may each include one or more transducer elements (such as in the form of the arrays described herein) configured to transmit sound waves into a body of water, receive sonar returns from the body of water, and convert the sonar returns into sonar return data.

Depending on the configuration, the watercraft 100 may include a main propulsion motor 105, such as an outboard or inboard motor. Additionally, the watercraft 100 may include trolling motor 108 configured to propel the watercraft 100 or maintain a position. The one or more transducer assemblies (e.g., 102*a*, 102*b*, and/or 102*c*) may be mounted in various positions and to various portions of the watercraft 100 and/or equipment associated with the watercraft 100. For example, the transducer assembly may be mounted to the transom 106 of the watercraft 100, such as depicted by transducer assembly 102*a*. The transducer assembly may be mounted to the bottom or side of the hull 104 of the watercraft 100, such as depicted by transducer assembly 102*b*. The transducer assembly may be mounted to the trolling motor 108, such as depicted by transducer assembly 102*c*.

The watercraft 100 may also include one or more marine electronic devices 160, such as may be utilized by a user to interact with, view, or otherwise control various aspects of the various sonar systems described herein. In the illustrated embodiment, the marine electronic device 160 is positioned proximate the helm (e.g., steering wheel) of the watercraft 100—although other places on the watercraft 100 are contemplated. Likewise, additionally or alternatively, a user's mobile device may include functionality of a marine electronic device.

FIGS. 2A-C illustrate an example array 220 of transducer elements 208 that may be utilized with various embodiments of the present invention, such as within an example transducer assembly described herein. In some embodiments, the transducer array 220 may include a plurality of transducer elements 208 arranged in a line and electrically connected relative to each other. For example, the transducer elements 208 may be individually positioned on a printed circuit board (PCB). The PCB may mechanically support and electrically connect the electronic components, including the transducer elements using conductive tracks (e.g. traces), pads, and other features. The conductive tracks may comprise sets of traces; for example, each transducer elements may be mounted to the PCB such that the transducer element is in electrical communication with a set of traces. Each transducer element, sub-array, and/or the array of transducer elements may be configured to transmit one or more sonar pulses and/or receive one or more sonar return signals. Unless otherwise stated, although FIGS. 2A-C illustrate a linear array with transducer elements of a certain shape, different types of arrays (or sub-arrays), transducer elements, spacing, shapes, etc. may be utilized with various embodiments of the present invention.

In the illustrated embodiment shown in FIG. 2A, the transducer array 220 includes an emitting face 221 with a length $L_A$ and a width $W_A$, where the length is greater than the width. Within the array 220, each transducer element 208 defines an emitting face 209 with a length $L_T$ and a width $W_T$, where the length is greater than the width. The length of each transducer element 208 is perpendicular to the length of the emitting face 221. Each transducer element 208 is spaced at a predetermined distance from an adjacent transducer element, which may be designed based on desired operating characteristics of the array 220, such as described herein.

In some embodiments, the array 220 of transducer elements 208 is configured to operate to transmit one or more sonar beams into the underwater environment. Depending on the configuration and desired operation, different transmission types of sonar beams can occur. For example, in some embodiments, the array 220 may transmit sonar beams according to a frequency sweep (e.g., chirp sonar) so as to provide sonar beams into the underwater environment. In some embodiments, the array 220 may be operated to frequency steer transmitted sonar beams into various volumes of the underwater environment. In some embodiments, the array 220 may be operated to cause a broadband transmit sonar beam to be sent into the underwater environment. Depending on the frequency used and phase shift applied between transducer elements, different volumes of the underwater environment may be targeted.

In some embodiments, the array 220 may be configured to receive sonar return signals. The way the sonar return signals are received and/or processed may vary depending on the desired sonar system configuration. FIGS. 2B-2C illustrate the array 220 with example possible sonar return beam coverage according to various example embodiments. In this regard, in some embodiments, each of the plurality of transducer elements are configured to operate at a fixed phase shift (e.g., at one of 0°, π/2 radian, π/4 radian, or π/8 radian) and vary in frequency (e.g., between 500 kHz-1200 kHz). This processing approach beamforms multiple sonar return beams (e.g., beam 280) between a first range of angles ($\theta_1$) 281 and between a second range of angles ($\theta_2$) 282. To explain, the sonar returns may be received by the array 220 and filtered into frequency bins based on the frequency of the signal. From that, sonar return beams 280 can be determined that provide sonar returns within a small angle window (e.g., 0.5° to 1°, although greater or lesser angle windows are contemplated). Since the mounting orientation with respect to the watercraft can be known, and the frequency is known, then the relative angle with respect to the waterline (or other reference) can be determined and used to form sonar imagery, as described herein.

With further reference to FIG. 2B, the sonar return beams (e.g., 280) can be "steered" (e.g., along arrow R) within the first range of angles 281 based on varying the frequency (e.g., between 291*a* and 291*b*). Likewise, the sonar return beams can be "steered" within the second range of angles 282 based on varying the frequency (e.g., between 292*a* and 292*b*). By operating the transducer elements at a fixed phase shift, the two range of angles 281, 282 can be covered with sonar beams, but there is also a gap (e.g., indicated by the range of angles β) that is not able to be covered by the frequency steered sonar return beams.

Without being bound by theory, a perhaps simplified explanation of this can be based on considering a single beam shape that is formed by a receipt event of the array. The beam shape is formed of a rather wide main beam lobe, along with at least one relatively small defined side lobe (e.g., the beam 280) that extends outwardly therefrom. By operating at a fixed phase shift and ignoring the main beam lobe, the sonar return signals received within the side lobe can be determined. Further, changing the frequency causes a shifting of the direction of the side lobe among the range of angles (281 or 282). Since the side lobe is symmetrical about the main lobe, there are two ranges of angles that are symmetrical about the facing direction DED of the emitting face 221 of the array 220.

Further information regarding beamforming, including frequency steered beamforming, can be found, for example, in the following: U.S. Pat. No. RE45,379, entitled "Frequency Division Beamforming for Sonar Arrays"; U.S. Pat. No. 10,114,119, entitled "Sonar Systems using Interferometry and/or Beamforming for 3D Imaging"; U.S. Pat. No. 9,739,884, entitled "Systems and Associated Methods for Producing a 3D Sonar Image"; and U.S. patent application Ser. No. 16/382,639, published as U.S. Publication No. 2019/0265354, and entitled "Sonar Transducer Having Geometric Elements"; the contents of each hereby being incorporated by reference in their entireties.

Depending on various factors, different beam shapes can be achieved and different ranges of angles can be achieved. The following describes some example factors that can be varied to effect the beam shapes and different ranges of angles: the number of transducer elements, the size/shape of the transducer elements, the size/shape of the array, the fixed phase shift, the frequency range, among other things. An example embodiment produces a first range of angles spanning ~22.5° and a second range of angles spanning ~22.5° with a gap of range of angles of ~45° therebetween. Additionally, sonar return beams of ~0.5° to 1° are formed. Further, with reference to FIG. 2C, a transverse beamwidth $\theta_3$ of ~20° is formed (although other transverse beamwidths are contemplated such as between ~9° and) 27°. Some example embodiments that may achieve such example beam shapes include an array length of between ~100-150 mm; an array width of between ~3-10 mm; an array thickness of between ~1-3 mm; a number of transducer elements of between 50-200; a width of the transducer element of between ~0.4-1 mm; and a length of the transducer element of between ~2-10 mm (although outside of these ranges is also contemplated).

In some embodiments, the system may be configured to utilize more than one array, where the arrays are oriented relative to each other to increase coverage volume of the underwater environment. For example, in some embodiments, a second (or more) array(s) can be added and tilted relative to the first array such that the gap within the first array is "covered" by one or more of the range of angles of sonar return beams from such array(s). FIG. 3 illustrates an example three array assembly 310 that is designed to provide continuous sonar coverage utilizing beamformed sonar return beams. The sonar assembly 310 includes a first array 340, a second array 330, and a third array 320. The first array 340 (shown by itself in FIG. 3A), is oriented with a facing direction (e.g., substantially straight down relative to the figure) so as to produce a first range of angles 341 and a second range of angles 342 (with a gap in between). The second array 330 (shown by itself in FIG. 3B), is oriented with a facing direction at an angle (e.g., −22.5° relative to the facing direction of the first array 340) so as to produce a first range of angles 331 and a second range of angles 332 (with a gap in between). The third array 320 (shown by itself in FIG. 3C), is oriented with a facing direction at another angle (e.g., −45° relative to the facing direction of the first array 340) so as to produce a first range of angles 321 and a second range of angles 322 (with a gap in between). As so arranged, the gaps between each set of the two range of angles are covered by a range of angles from each of the other two arrays. The illustrated example thus provides continuous sonar beam coverage for ~135°.

FIG. 4 illustrates another example transducer assembly 510 that includes an arrangement of three arrays arranged to provide continuous sonar coverage utilizing beamformed sonar return beams. Notably, while the first array 540 and the third array 520 are mounted and oriented similarly to the first and third arrays of the transducer assembly 310 of FIG. 3, the second array 530 of the transducer assembly 510 has been shifted (e.g., offset) while maintaining its relative angle orientation (e.g., it is still mounted with a facing direction at an angle (e.g., −22.5°) relative to the facing direction of the first array—just as in the transducer assembly 310). Thus, the transducer assembly 510 forms an "X" configuration for the first array 540 and the third array 520, but also has a line "_" at the bottom of the "X" corresponding to the second array 530. Notably, the same relative continuous sonar beam coverage is obtained (e.g., as the small relative shift from the centerpoint 315 in FIG. 3 does not significantly change the resulting beam coverage-particularly with respect to the distance covered in the underwater environment). For explanatory purposes, the various ranges of angles are shown extending from a slightly revised centerpoint 515.

FIG. 5 illustrates an example transducer assembly 602 including a housing 605 that houses the three arrays 620, 630, 640 (which are shown in exploded view in FIG. 6). Notably, the housing 605 includes one or more mounting features (e.g., a ratchet-type mounting feature 604 for enabling secured attachment in different orientations). The cable 606 provides a safe channel for running various wires 607 used in conjunction with the arrays. Notably, the X plus line configuration of the arrays enables some benefits for the transducer assembly 602. For example, the housing 605 of the transducer assembly 602 may maintain a small footprint and still provide a straight bottom that enables a user to more easily comprehend the position of the center array (and, thus, determine and orient the transducer assembly 602 properly with respect to the watercraft for the desired coverage). With reference to FIG. 6, the PCB 609 and the electrical connectors 603 are also shown for electrically connecting the arrays 620, 630, and 640. FIG. 7 illustrates an example transducer assembly 602' shown in an orientation that would provide similar beam coverage as shown in FIG. 4.

FIG. 8 illustrates a watercraft 100 with an example transducer assembly 702 utilizing three arrays to provide continuous sonar coverage 705 in the forward and downward directions relative to the watercraft 100. In this regard, the three arrays work together to provide corresponding ranges of angles 721, 722, 731, 732, 741, 742—similar to those shown and described with respect to FIG. 4. In the illustrated embodiments, the lengths of each of the emitting faces of the three arrays extends in the fore-to-aft direction of the watercraft.

As indicated herein, the frequency of the sonar return beams can be varied to provide a sonar return beam 706 that can sweep (e.g., along arrow A) within the sonar beam coverage 705 (e.g., across the three arrays)—to capture sonar return signals along the sonar beam coverage. FIG. 9 illustrates the sonar beam coverage 705 from a top view (with the beam coverage 705 projected onto a seafloor). As illustrated the sonar return beam 706 would sweep (e.g., along arrow B) across the sonar beam coverage 705.

In some embodiments, the transducer assembly can be used to form a live (or substantially real-time) two-dimensional (2D) sonar image (e.g., time/distance from the transducer assembly and angle). For example, FIG. 10 illustrates a live 2D sonar image 780 presented on a display of a marine electronics device 760. The live 2D sonar image 780 is formed as slices of sonar return data corresponding to each sonar return beam 786 extending within that sonar beam coverage (e.g., along arrow C). In this regard, the live 2D sonar image 780 can be updated in substantially real-time all at once as they were all received at substantially the same time (e.g., by selecting different frequencies to form all the different sonar return beams that are used to present sonar return data into the image at the proper angle). The reference distance from the transducer assembly 785 (e.g., which correlates to depth in the substantially straight down direction) is shown at 789. An icon detailing the direction in which the transducer assembly is facing relative to the watercraft is shown at 787.

In some embodiments, the transducer assembly can be used to form additional different-type sonar images, such as sonar images that anglers are used to seeing. For example, while the arrays provide complex transducer element arrangements that can be used to create the live 2D sonar image, some embodiments contemplate using the same transducer assembly to provide "waterfall" based (or one-dimensional (1D)) sonar images that build-up over time. Notably, the sonar system may select one or more of the sonar return beams to form the sonar images—all without other additional transducer elements.

In some embodiments, the sonar system may be configured to form high-definition 1D sonar images that build-up over time (e.g., across different sonar return receipts). As noted herein, each sonar return beam corresponds to an angle window (e.g., ~0.5°-1°—although other angle windows are contemplated). By utilizing the sonar return beam (or a few sonar return beams) that corresponds to substantially straight down, the system can form a downward 1D sonar image with high definition. In this regard, the resulting beam shape (e.g., a fan shape) for one (or a few) sonar beam(s) being selecting would be relatively narrow in the fore-to-aft direction (e.g., within 0.5°-3°, preferably within 0.5°-1°) and relative wide in the port-to-starboard direction (e.g., within) ~10°-27°. Notably, additional sonar return beams being selected would increase the beamwidth in the fore-to-aft direction (e.g., making a 2° by 20° beam shape, etc.). In this regard, in some embodiments, more than one sonar return beam could be selected and still produce the desired downward 1D sonar image with high-definition.

Such a beam shape would produce high definition downscan sonar imagery that would show high detail structure, such as the bottom surface, trees, etc. In this regard, the resulting sonar image is equivalent to that produced by a linear downscan transducer—which is a sonar image that anglers have gotten used to using. Notably, however, the angler would not have to purchase a separate transducer assembly with the linear transducer. An example linear downscan transducer is further described in U.S. Pat. No. 8,300,499, entitled "Linear and Circular Downscan Imaging Sonar", which is incorporated by reference herein in its entirety.

FIG. 11 illustrates the arrangement of the three example arrays used for the transducer assembly 710. In the illustrated example, the sonar return beam 777 is shown, which is the sonar return beam that corresponds to an angle within a range of angles 741 of one of the arrays 720—where the angle is substantially straight downward from the watercraft. In this regard, the determined sonar return beam 777 comes from the third array 720. In some embodiments, the selected sonar return beam 777 may be pre-determined and utilized whenever a user wants to see the high-definition 1D sonar image, or it may be determined based on the orientation of the transducer assembly 710 (e.g., using an orientation sensor and determining the orientation of the transducer assembly with respect to a reference, such as the top surface of the body of water—e.g., waterline). In this regard, though the third array 720 included the indicated sonar return beam that corresponds to substantially straight down, in different orientations, the first or second array may instead include the appropriate sonar return beam. Further, as noted above, though one sonar return beam 777 is shown, more than one could be selected (e.g., three sonar return beams, such as one on each side of the shown sonar return beam 777).

Once determined (whether pre-determined or determined otherwise), the sonar system may be configured to generate a corresponding sonar image that utilizes sonar return data from the one or more sonar return beam. For example, FIG. 12 shows an example marine electronic device 760 presenting a high-definition 1D (e.g., time/distance) downward sonar image 790. Notably, the sonar image 790 builds up from right to left in a "waterfall" format (e.g., along arrow D) with each subsequent slice of sonar image portions 793 filling on the right side of the sonar image 790 and pushing the older slices to the left (e.g., from sonar return data taken at different, older times). Notably, detailed bottom surface 791 and underwater structure 792 (e.g., seaweed or underwater trees) are visible in the sonar image 790. This is, in some embodiments, due to the small beam width used for each slice in the fore-to-aft direction.

In some embodiments, the sonar system may be configured to form 1D sonar images with desirable fish finding features (e.g., fish arches). Such an example sonar image would build-up over time (e.g., across different sonar return receipts). As noted herein, each sonar return beam corresponds to an angle window (e.g., ~0.5°-1°—although other angle windows are contemplated). By utilizing a plurality of sonar return beams (e.g., a range of angles), where at least one corresponds to substantially straight down, the system can form a downward 1D sonar image with fish arches. In this regard, the resulting beam shape for a plurality of sonar beams being selecting may be relatively wide (e.g., above 10°) in both the fore-to-aft direction (e.g., within the range of ~10°-45°, (preferably ~20°-40°) and the port-to-starboard direction (e.g., within the range of ~10°-27°).

Such a beam shape would produce fish arch images within the downscan sonar imagery that would be desirable for anglers. In this regard, the resulting sonar image is equivalent to that produced by a conical (or circular) downscan transducer—which is a sonar image that anglers have gotten used to using. Notably, however, the angler would not have to purchase a separate transducer assembly with the conical transducer. An example conical downscan transducer is further described in U.S. Pat. No. 8,300,499, entitled "Linear and Circular Downscan Imaging Sonar", which is incorporated by reference herein in its entirety.

FIG. 13 illustrates the arrangement of the three example arrays used for the transducer assembly 710. In the illustrated example, the plurality of sonar return beams 778 is shown selected (with a single one of the sonar return beams 779 also illustrated). In the illustrated embodiment, at least one of the selected sonar return beams with the plurality of sonar return beams 778 includes an angle within a range of angles 741 of one of the arrays 720—where the angle is substantially straight downward from the watercraft. In the illustrated embodiment, the determined plurality of sonar return beams 778 comes from all three arrays 720, 730, 740. This requires filtering frequencies across different arrays to then combine together to form the desired plurality of sonar return beams 778. In some embodiments, less or different sonar return beams could be selected and only one or two arrays may be needed. In some embodiments, the selected plurality of sonar return beams 778 may be pre-determined and utilized whenever a user wants to see the ID sonar image with fish arches, or it may be determined based on the orientation of the transducer assembly 710 (e.g., using an orientation sensor and determining the orientation of the transducer assembly with respect to a reference, such as the top surface of the body of water—e.g., waterline). In this regard, though the third array 720 included the indicated sonar return beam that corresponds to substantially straight down, in different orientations, the first or second array may instead include the appropriate sonar return beams.

In some embodiments, the selected plurality of sonar return beams (e.g., range of angles) may extend to both sides of the sonar return beam that corresponds to substantially straight down (e.g., 10° in the clockwise direction and 5° in the counter-clockwise direction, 10° in both directions, etc.). In some embodiments, the selected plurality of sonar return beams may be determined to include the sonar return beam with the angle corresponding to substantially straight down in the center.

Once determined (whether pre-determined or determined otherwise), the sonar system may be configured to generate a corresponding sonar image that utilizes sonar return data from the plurality of sonar return beams. For example, FIG. 14 shows an example marine electronic device 760 presenting a ID (e.g., time/distance) downward sonar image 795 with fish arches 797. Notably, the sonar image 795 builds up from right to left in a "waterfall" format (e.g., along arrow E) with each subsequent slice of sonar image portions 798 filling on the right side of the sonar image 795 and pushing the older slices to the left (e.g., from sonar return data taken at different, older times). Notably, less-detailed bottom surface 796 along with the fish arches 797 are visible in the sonar image 795. This is, in some embodiments, due to the wide beam width used for each slice in the fore-to-aft direction.

In some embodiments, the sonar system may be configured to form a desirable combination sonar image that includes both high-definition underwater structure (e.g., bottom surface and other structure) as well as desirable fish finding features (e.g., fish arches). Due to differing beam widths required to produce each sonar image feature, such a sonar image is not possible using just one beam width. In this regard, some embodiments of the present invention contemplate forming such a sonar image using example transducer assemblies that include one or more arrays, without the need for other transducer elements (e.g., a linear transducer element or a conical transducer element).

In this regard, in some embodiments, like the 1D sonar images described herein, such an example sonar image would also build-up over time (e.g., across different sonar return receipts). Further, however, both sets of determined sonar return beams would be utilized to gather sonar return data that is inputted together into the sonar image. For example, returning to FIG. 11, the sonar return beam 777 (or equivalent as described herein) would be selected for the high-definition features and, returning to FIG. 13, the plurality of sonar return beams 778 (or equivalent as described herein) would be selected for the fish arch features. As with the prior described sonar images, such sonar return beams could be pre-determined or determined otherwise (e.g., via an orientation sensor). Likewise, as described with respect to each of the example sonar return beam 777 and the plurality of sonar return beams 778, more or less (or different) sonar return beams could be selected to achieve the desired sonar return data.

In some embodiments, the system could be configured to form the sonar image from both the one of the multiple sonar return beams (e.g., the sonar return beam 777) and the plurality of the multiple sonar beams (e.g., the sonar return beams 778). For example, the sonar system may form the sonar image from sonar image portions corresponding to each sonar return beam set, where the sonar image portions are then combined to form the sonar image. As an example, the system may determine one or more fish arches based on sonar return data from the plurality of sonar return beams (e.g., sonar return beams 778), form the sonar image portions of the fish arches, and then position them in appropriate positions (e.g., at the depth and time associated with the sonar return data of the fish arches) within the sonar image portions corresponding to the sonar return beam 777. While this example describes fish arches, additional or other features (or depth portions) within the sonar return data from the plurality of sonar return beams could be used.

In some embodiments, the sonar system is configured to determine the fish arch from within sonar return data corresponding to the plurality of multiple sonar return beams that have been received across at least two or more time receipts. Such a determination could be performed using various filters or algorithms to distinguish between sonar return data that applies to fish (or fish-like objects)—e.g., using the strength of the sonar return, depth, relative position with respect to similar strength sonar returns, etc. In some embodiments, the image could be formed, and image recognition technology could be applied to identify the fish arch. In some embodiments, the fish arch may need to be of a certain size or shape threshold in order to qualify for use. For example, FIG. 14 illustrates an example fish arch 797 that has a height $H_{FA}$ and a width $W_{FA}$ that can be determined to qualify. In some embodiments, the degree of arch may also be a factor for determining a qualifying fish arch.

With the fish arches identified, the sonar image may be formed by combining the sonar image portions corresponding to the fish arches with the sonar image portions corresponding to the sonar return data received by the sonar return beam 777. For example, in some embodiments, the system is configured to generate the sonar image portion corresponding to the fish arch by removing or nullifying sonar image data (e.g., sonar return data formed into image compatible data) within the sonar return data that is not the determined fish arch. Alternatively, the system may form the sonar image portion of the fish arch only.

Once the fish arch image portion is formed, the system may position the fish arch appropriately within the remaining sonar image portion (from the plurality of sonar return beams). For example, the system may determine the depth and time associated with the sonar return data corresponding to the fish arch; and position the generated sonar image portion of the fish arch at the position within the sonar image portions corresponding to the plurality of sonar return beams (e.g., sonar return beams 778) at the determined depth and time. In some embodiments, the fish arch sonar image portions may be overlaid onto the remaining sonar image portions (from the plurality of sonar return beams). Additionally or alternatively, the fish arch sonar image portions may replace corresponding portions of the remaining sonar image portions (from the plurality of sonar return beams).

In some embodiments, the resulting combined sonar image could be generated a number of different ways using sonar return data corresponding to both the sonar return beam 777 and the plurality of sonar return beams 778. For example, the sonar image could be formed by blending the sonar return data, including, in some embodiments, applying a greater weight to one set of the sonar return data. In some embodiments, a depth range of each sonar return data could be used. For example, the water column (from the watercraft to the bottom surface) could be used for the plurality of sonar return beams 778 (e.g., to show fish arches), while the bottom surface and below could be used for the sonar return beam 777 (e.g., to show the detail of the bottom surface). Slight variations in depth (e.g., the bottom surface plus 5 feet) could be used instead.

FIG. 15 shows an example marine electronic device 760 presenting a combined downward sonar image 718. Notably, the sonar image 718 builds up from right to left in a "waterfall" format (e.g., along arrow F) with each subsequent slice of sonar image portions 713 filling on the right side of the sonar image 718 and pushing the older slices to the left (e.g., from sonar return data taken at different, older times). Notably, the combined sonar image 713 includes detailed bottom surface 711 and other underwater structure (e.g., from the single or a few sonar return beams, such as sonar return beam 777) as well as the fish arches 712 (e.g., from the plurality of sonar return beams, such as sonar return beams 778). Such an image provides the desirable high-definition structure along with desirable fish arches that anglers are used to—all in one sonar image.

In some embodiments, the system may be configured to present one or more of the four different sonar images described herein—all based on utilizing the same transducer assembly (with one or more arrays). In this regard, the user can simply select which of the sonar images to have presented, and they are swappable as the system may be generating the sonar images simultaneously in the background. In some embodiments, the sonar system may provide three sonar image possibilities: a 2D live sonar image such as shown and described in FIG. 10, a 1D downward sonar image with fish finding features such as shown and described in FIG. 14, and a downward sonar image with high resolution surface features and fish arches shown and described in FIG. 15 (although in some embodiments the downward sonar image with high resolution features shown and described in FIG. 12 may be toggled between with the downward sonar image with high resolution surface features and fish arches shown and described in FIG. 15). In some embodiments, the system may be configured to present two or more such sonar images in split screen (or multiple screen) mode. For example, FIG. 15A shows an example marine electronic device 760 presenting a split screen of a two-dimensional (2D) live sonar image 780 and a downward sonar image with high resolution surface features and fish arches 718.

In some embodiments, the transducer assembly may be mounted to different portions of the watercraft or its corresponding devices (e.g., a trolling motor, pole, etc.). For example, FIG. 16A illustrates the transducer assembly 802 mounted to a pole 810 (e.g., a shaft of a trolling motor) using a mounting arm 806. The mounting arm 806 attaches via a fastener to the transducer assembly 802 at a first end 807 and to the pole 810 via a clamp 808 at a second end 805. The mounting arm 806 includes a bend that enables the transducer assembly 802 to be spaced from the pole 810 and oriented as desired (e.g., facing generally downward along arrow G). FIG. 16B illustrates the transducer assembly 802 mounted to the trolling motor housing 812 via a strap and clamp 804. The transducer assembly 802 may be oriented as desired (e.g., facing generally downward along the arrow G).

As detailed herein, in some embodiments, the system may be configured to provide similar functionality utilizing only a single array of transducer elements. In this regard, the system may be more cost effective for anglers and still provide desirable functionality. For example, FIG. 17 illustrates a watercraft 100 with a transducer assembly 1002 that includes a single array that produces beam coverage as indicated by the first range of angles 1041 and the second range of angles 1042. In this regard, the single array is mounted and oriented in a generally forward and downward facing direction. The sonar return beams **1006*a* and 1006*b* (when taken alone or in a plurality) can be used to form the various sonar images described herein. In this regard, like various arrays described herein, the sonar return beam 1006*a* can be frequency steered through the first range of angles 1041 (e.g., along arrow K), while the sonar return beam 1006*b* can be frequency steered through the second range of angles 1042 (e.g., along arrow L). FIG. 18 illustrates the array 1040 of the transducer assembly 1002 with an example sonar return beam 1077 indicated, such as may be determined and/or used for various example sonar images, such as shown and described with respect to FIGS. 13, 15, and 15A. Likewise, FIG. 19 illustrates the array 1040 of the transducer assembly 1002 with an example plurality of sonar return beams 1078 indicated (with an example single sonar return beam 1079 indicated also), such as may be determined and/or used for various example sonar images, such as shown and described with respect to FIGS. 14, 15, and 15**A.

In some embodiments, the transducer assembly can be configured to be oriented differently to provide different sonar image options. For example, the transducer assembly may be configured to be oriented horizontally (such as pointing forward from the watercraft) and provide a desirable sonar image. In this regard, the extended sonar beam coverage (e.g., ~135°) may be used to see a wider view in the port-to-starboard direction with respect to the watercraft (or off to one side of the watercraft or both sides if two transducer assemblies are used).

FIG. 20 illustrates a watercraft 100 with an example transducer assembly 902 utilizing three arrays to provide continuous sonar coverage 905 horizontally in the forward direction relative to the watercraft 100 (e.g., port-to-starboard). In this regard, the three arrays work together to provide corresponding ranges of angles 921, 922, 931, 932, 941, 942—similar to those shown and described with respect to FIG. 4. In the illustrated embodiments, the lengths of each of the emitting faces of the three arrays extends in the port-to-starboard direction of the watercraft. As indicated herein, the frequency of the sonar return beams can be varied to provide a sonar return beam 906 that can sweep (e.g., along arrow H) within the sonar beam coverage 905 (e.g., across the three arrays)—to capture sonar return signals along the sonar beam coverage. With such an example set-up, the resulting 2D live sonar image would show a live (or near real-time) sonar image corresponding to the volume extending in front of the watercraft according to the beam coverage.

In some embodiments, the transducer assembly can be used to form a live (or substantially real-time) two-dimensional (2D) sonar image (e.g., time/distance from the transducer assembly and angle) with a horizontal view. For example, FIG. 20A illustrates a live 2D sonar image 727 presented on a display of a marine electronics device 760. The live 2D sonar image 727 is formed as slices of sonar return data corresponding to each sonar return beam extending within that sonar beam coverage extending from the transducer assembly location 728. In this regard, the live 2D sonar image 727 can be updated in substantially real-time all at once as they were all received at substantially the same time (e.g., by selecting different frequencies to form all the different sonar return beams that are used to present sonar return data into the image at the proper angle). The detailed bottom surface is shown at 729.

In some embodiments, the transducer assembly may be mounted to different portions of the watercraft or its corresponding devices (e.g., a trolling motor, pole, etc.). For example, FIG. 21A illustrates the transducer assembly 902 mounted to a pole 910 (e.g., a shaft of a trolling motor) using a mounting arm 906. The mounting arm 906 attaches via a fastener to the transducer assembly 902 at a first end 907 and to the pole 910 via a clamp 908 at a second end 905. The mounting arm 906 includes a bend that enables the transducer assembly 902 to be spaced from the pole 910 and oriented as desired (e.g., facing generally forward along arrow J). FIG. 21B illustrates the transducer assembly 902 mounted to the trolling motor housing 912 via a strap and clamp 904. The transducer assembly 902 may be oriented as desired (e.g., facing generally forward along the arrow J).

Example System Architecture

FIG. 22 shows a block diagram of an example sonar system 400 of various embodiments of the present invention described herein. The illustrated sonar system 400 includes a marine electronic device 405 and a transducer assembly 462, although other systems and devices may be included in various example systems described herein. In this regard, the system 400 may include any number of different systems, modules, or components; each of which may comprise any device or means embodied in either hardware, software, or a combination of hardware and software configured to perform one or more corresponding functions described herein.

The marine electronic device 405 may include a processor 410, a memory 420, a user interface 435, a display 440, one or more sensors (e.g. position sensor 445, other sensors 447, etc.), and a communication interface 430. One or more of the components of the marine electronic device 405 may be located within a housing or could be separated into multiple different housings (e.g., be remotely located).

The processor 410 may be any means configured to execute various programmed operations or instructions stored in a memory device (e.g., memory 420) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data. For example, the processor 410 may be configured to receive sonar return data, generate sonar image data, and generate one or more sonar images based on the sonar image data.

In some embodiments, the processor 410 may be further configured to implement sonar signal processing, such as in the form of a sonar signal processor (although in some embodiments, portions of the processor 410 or the sonar signal processor could be located within the transducer assembly 462). In some embodiments, the processor 410 may be configured to perform enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

In an example embodiment, the memory 420 may include one or more non-transitory storage or memory devices such as, for example, volatile and/or non-volatile memory that may be either fixed or removable. The memory 420 may be configured to store instructions, computer program code, marine data, such as sonar data, chart data, location/position data, and other data associated with the navigation system in a non-transitory computer readable medium for use, such as by the processor for enabling the marine electronic device 405 to carry out various functions in accordance with example embodiments of the present invention. For example, the memory 420 could be configured to buffer input data for processing by the processor 410. Additionally or alternatively, the memory 420 could be configured to store instructions for execution by the processor 410.

The communication interface 430 may be configured to enable connection to external systems (e.g. an external network 402). In this manner, the marine electronic device 405 may retrieve stored data from a remote device 461 via the external network 402 in addition to or as an alternative to the onboard memory 420. Additionally or alternatively, the marine electronic device may transmit or receive data, such as sonar signals, sonar returns, sonar image data or the like to or from a transducer assembly 462. In some embodiments, the marine electronic device 405 may also be configured to communicate with other devices or systems (such as through the external network 102 or through other communication networks, such as described herein). For example, the marine electronic device 405 may communicate with a propulsion system of the watercraft 100 (e.g., for autopilot control); a remote device (e.g., a user's mobile device, a handheld remote, etc.); or other system.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. In this regard, numerous other peripheral devices (including other marine electronic devices or transducer assemblies) may be included in the system 400.

The position sensor 445 may be configured to determine the current position and/or location of the marine electronic device 405 (and/or the watercraft 100). For example, the position sensor 445 may comprise a global positioning system (GPS), bottom contour, inertial navigation system, such as machined electromagnetic sensor (MEMS), a ring laser gyroscope, or other location detection system.

The display 440, e.g. one or more screens, may be configured to present images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In some embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 22 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405.

The marine electronic device 405 may include one or more other sensors 447 configured to measure or sense various other conditions. The other sensors 447 may include, for example, an air temperature sensor, a water temperature sensor, a current sensor, a light sensor, a wind sensor, a speed sensor, or the like.

The transducer assembly 462 illustrated in FIG. 22 includes three transducer arrays 467, 468, and 469. In some embodiments, more or less transducer arrays could be included or other transducer elements could be included. As indicated herein, the transducer assembly 462 may also include a sonar signal processor or other processor (although not shown) configured to perform various sonar processing. In some embodiments, the processor (e.g., processor 410 in the marine electronic device 405, a processor (or processor portion) in the transducer assembly 462, or a remote processor-or combinations thereof) may be configured to filter sonar return data and/or selectively control transducer elements of the transducer arrays. For example, various processing devices (e.g., a multiplexer, a spectrum analyzer, A-to-D converter, etc.) may be utilized in controlling or filtering sonar return data and/or transmission of sonar signals from the arrays 467, 468, 469.

The transducer assembly 462 may also include one or more other systems, such as various sensor(s) 466. For example, the transducer assembly 462 may include an orientation sensor, such as gyroscope or other orientation sensor (e.g., accelerometer, MEMS, etc.) that can be configured to determine the relative orientation of the transducer assembly 462 and/or the various arrays 467, 468, 469—such as with respect to a waterline, the top surface of the body of water, or other reference. In some embodiments, additionally or alternatively, other types of sensor(s) are contemplated, such as, for example, a water temperature sensor, a current sensor, a light sensor, a wind sensor, a speed sensor, or the like.

FIG. 23 shows a block diagram of another example sonar system 400' of various embodiments of the present invention described herein. The illustrated sonar system 400' includes the same various components and devices as the system 400 shown and described with respect to FIG. 22, but instead of three transducer arrays, the system 400' includes a single transducer array 467' in the transducer assembly 462'. Such an example transducer assembly 462' with a single transducer array 467' may correspond to various embodiments herein, such as some example embodiments shown and described with respect to FIGS. 17-19.

Example Flowchart(s) and Operations

Embodiments of the present invention provide methods, apparatus and computer program products for operating a sonar system according to various embodiments described herein. Various examples of the operations performed in accordance with embodiments of the present invention will now be provided with reference to FIGS. 24-25.

FIG. 24 illustrates a flowchart according to example methods for operating a sonar system according to an example embodiment. The operations illustrated in and described with respect to FIG. 24 may, for example, be performed by, with the assistance of, and/or under the control of one or more of the processor 410, memory 420, communication interface 430, user interface 435, position sensor 445, other sensor 447, transducer assembly 462, 462', display 440, and/or external network 402/remote device 461. The method 500 may include operating one or more arrays to transmit sonar signals into the underwater environment at operation 502. At operation 504, the method comprises receiving sonar return data from the one or more arrays. Then, at operation 506, the sonar return data is filtered to beamform multiple sonar return beams. At operation 508, the method may include determining downward sonar return beams for forming high-resolution 1D sonar imagery. The method may further include determining downward sonar return beams for forming fish arches at operation 510. Finally, at operation 512, the method may include forming sonar images with high resolution sonar portions and fish arches, such as described herein. In some embodiments, the method may include additional, optional operations, and/or the operations described above may be modified or augmented, such as in accordance with various example embodiments described herein.

FIG. 25 illustrates a flowchart according to example methods for operating a sonar system according to another example embodiment. The operations illustrated in and described with respect to FIG. 25 may, for example, be performed by, with the assistance of, and/or under the control of one or more of the processor 410, memory 420, communication interface 430, user interface 435, position sensor 445, other sensor 447, transducer assembly 462, 462', display 440, and/or external network 402/remote device 461. The method 600 may include operating one or more arrays to transmit sonar signals into the underwater environment at operation 602. At operation 604, the method comprises receiving sonar return data from the one or more arrays. Then, at operation 606, the sonar return data is filtered to beamform multiple sonar return beams. At operation 608, the method may include forming a 2D live sonar image using the multiple sonar return beams. At operation 610, the method may further include forming a downward sonar image with high resolution using one or more downward sonar return beams, such as described herein. At operation 612, the method may further include forming a downward sonar image with fish arches using a plurality of downward sonar return beams, such as described herein. In some embodiments, the method may include additional, optional operations, and/or the operations described above may be modified or augmented, such as in accordance with various example embodiments described herein.

FIGS. 24-25 illustrate flowcharts of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A system for imaging an underwater environment of a body of water, the system comprising:

a single array of a plurality of transducer elements mounted to a watercraft on the body of water, wherein the single array of the plurality of transducer elements is oriented with an emitting face in a facing direction, wherein the facing direction is generally forward and downward of the watercraft, wherein the emitting face of the single array of the plurality of transducer elements defines a width and a length, wherein the length of the emitting face is greater than the width of the emitting face, and wherein the length of the emitting face extends in a fore-to-aft direction of the watercraft, wherein the facing direction is perpendicular to the emitting face, wherein each of the plurality of transducer elements defines a length and a width, wherein the length of each of the plurality of transducer elements is greater than the width of each of the plurality of transducer elements, wherein the length of each of the plurality of transducer elements is perpendicular to the length of the emitting face, wherein the plurality of transducer elements are configured to transmit one or more sonar beams into the underwater environment, and wherein the single array of the plurality of transducer elements is configured to operate each of the plurality of transducer elements at a fixed phase shift and vary in frequency so as to beamform multiple sonar return beams across the emitting face between a first range of angles in the fore-to-aft direction and between a second range of angles in the fore-to-aft direction, wherein the first range of angles is symmetrical to the second range of angles with respect to the facing direction, and wherein a gap of a third range of angles in the fore-to-aft direction separates the first range of angles and the second range of angles, wherein the first range of angles cover a generally downward direction from the watercraft, wherein the second range of angles cover a generally forward and downward direction from the watercraft; and a sonar signal processor in communication with the single array and configured to:

operate the single array to cause the plurality of transducer elements to transmit the one or more sonar beams into the underwater environment;

receive sonar return data from the plurality of transducer elements of the array;

filter the sonar return data based on frequency to form the multiple sonar return beams;

determine a plurality of the multiple sonar return beams from within the first range of angles that correspond to a fourth range of angles in the fore-to-aft direction including an angle within the first range of angles that is substantially straight downward from the watercraft, wherein the plurality of the multiple sonar return beams form a beam shape that is defined by a fore-to-aft angle within a range of 10°-45° in the fore-to-aft direction and a port-to-starboard angle within a range of 10°-27° in a port-to-starboard direction, wherein the fore-to-aft angle is the fourth range of angles that corresponds to the determined plurality of the multiple sonar return beams;

determine one or more of the multiple sonar return beams from within the first range of angles that includes the angle within the first range of angles that is substantially straight downward from the watercraft, wherein the one or more of the multiple sonar return beams form a fan-shaped beam that is defined by a fore-to-aft angle within a range of 0.5°-3° in the fore-to-aft direction and a port-to-starboard angle within a range of 10°-27° in the port-to-starboard direction, wherein the fore-to-aft angle is the angle within the first range of angles that corresponds to the determined one or more of the multiple sonar return beams;

generate a first sonar image of the underwater environment forward and downward from the watercraft, wherein the first sonar image is a forward two-dimensional live sonar image that is formed of sonar return data from multiple sonar return beams that correspond to the second range of angles, and wherein the sonar return data used to form the forward two-dimensional live sonar image was received at substantially a same time by the plurality of transducer elements;

generate a second sonar image of the underwater environment downward from the watercraft, wherein the second sonar image is a downward two-dimensional live sonar image that is formed of sonar return data from multiple sonar return beams that correspond to the first range of angles, and wherein the sonar return data used to form the downward two-dimensional live sonar image was received at substantially a same time by the plurality of transducer elements;

generate a third sonar image of the underwater environment downward from the watercraft, wherein the third sonar image is formed from the determined plurality of the multiple sonar return beams that corresponds to the fourth range of angles, wherein the third sonar image is formed of a plurality of sonar image portions built up over time, wherein each of the plurality of sonar image portions corresponds to sonar return data from the determined plurality of the multiple sonar return beams received at different times; and generate a fourth sonar image of the underwater environment downward from the watercraft, wherein the fourth sonar image is formed from the determined one or more of the multiple sonar return beams that includes the angle within the first range of angles that is substantially straight downward from the watercraft, wherein the fourth sonar image is formed of a plurality of sonar image portions built up over time, wherein each of the plurality of sonar image portions corresponds to sonar return data from the determined one or more of the multiple sonar return beams received at different times.

2. The system of claim 1 further comprising an orientation sensor configured to determine an orientation of the single array, and wherein the sonar signal processor is further configured to (i) determine the plurality of the multiple sonar return beams that correspond to the fourth range of angles based on data from the orientation sensor, and (ii) determine the one or more of the multiple sonar return beams that includes the angle within the first range of angles that is substantially straight downward from the watercraft based on the data from the orientation sensor.

3. The system of claim 1, wherein the first range of angles is defined by a fore-to-aft angle around 22.5° and the second range of angles is defined by a fore-to-aft angle around 22.5°.

4. The system of claim 1, wherein the fourth range of angles includes angles that extend to each side of the angle within the first range of angles that is substantially straight downward from the watercraft.

5. The system of claim 4, wherein the fourth range of angles are determined such that the angle within the first range of angles that is substantially straight downward from the watercraft is generally in a center of the fourth range of angles.

6. The system of claim 1, wherein the plurality of the multiple sonar return beams that correspond to the fourth range of angles are the same as the multiple sonar return beams that correspond to the first range of angles from the single array.

7. The system of claim 1 further comprising a user interface including a display, wherein the user interface is configured to receive user input, wherein the sonar signal processor is configured to receive an indication of user input indicating a selection to present the first sonar image and, in response, cause the user interface to present the first sonar image.

8. The system of claim 7, wherein the sonar signal processor is configured to receive an indication of user input indicating a selection to present both the first sonar image and the fourth sonar image and, in response, cause the user interface to present both the first sonar image and the fourth sonar image in split screen mode.

9. A transducer assembly mountable to a watercraft for imaging an underwater environment of a body of water, the transducer assembly comprising:

a single array of a plurality of transducer elements, wherein the single array of the plurality of transducer elements is configured to be oriented with an emitting face in a facing direction that is generally forward and downward of the watercraft, wherein the emitting face of the single array of the plurality of transducer elements defines a width and a length, wherein the length of the emitting face is greater than the width of the emitting face, and wherein the length of the emitting face extends in a fore-to-aft direction of the watercraft, wherein the facing direction is perpendicular to the emitting face, wherein each of the plurality of transducer elements defines a length and a width, wherein the length of each of the plurality of transducer elements is greater than the width of each of the plurality of transducer elements, wherein the length of each of the plurality of transducer elements is perpendicular to the length of the emitting face, wherein the plurality of transducer elements are configured to transmit one or more sonar beams into the underwater environment, and wherein the single array of the plurality of transducer elements is configured to operate each of the plurality of transducer elements at a fixed phase shift and vary in frequency so as to beamform multiple sonar return beams across the emitting face between a first range of angles in the fore-to-aft direction and between a second range of angles in the fore-to-aft direction, wherein the first range of angles is symmetrical to the second range of angles with respect to the facing direction, and wherein a gap of a third range of angles in the fore-to-aft direction separates the first range of angles and the second range of angles, wherein the first range of angles cover a generally downward direction from the watercraft, wherein the second range of angles cover a generally forward and downward direction from the watercraft; and a sonar signal processor in communication with the single array and configured to:

cause operation of the plurality of transducer elements to transmit the one or more sonar beams into the underwater environment;

receive sonar return data from the plurality of transducer elements of the array;

filter the sonar return data based on frequency to form the multiple sonar return beams;

determine a plurality of the multiple sonar return beams that correspond to a fourth range of angles in the fore-to-aft direction including an angle within the first range of angles that is substantially straight downward from the watercraft, wherein the plurality of the multiple sonar return beams form a beam shape that is defined by a fore-to-aft angle within a range of 10°-45° in the fore-to-aft direction and a port-to-starboard angle within a range of 10°-27° in a port-to-starboard direction, wherein the fore-to-aft angle is the fourth range of angles that corresponds to the determined plurality of the multiple sonar return beams;

determine one or more of the multiple sonar return beams that includes the angle within the first range of angles that is substantially straight downward from the watercraft, wherein the one or more of the multiple sonar return beams form a fan-shaped beam that is defined by a fore-to-aft angle within a range of 0.5°-3° in the fore-to-aft direction and a port-to-starboard angle within a range of 10°-27° in the port-to-starboard direction, wherein the fore-to-aft angle is the angle within the first range of angles that corresponds to the determined one or more of the multiple sonar return beams, wherein the one or more of the multiple sonar return beams is less than the plurality of the multiple sonar return beams that correspond to the fourth range of angles;

generate a first sonar image of the underwater environment forward and downward from the watercraft, wherein the first sonar image is a forward two-dimensional live sonar image that is formed of sonar return data from multiple sonar return beams that correspond to the second range of angles, and wherein the sonar return data used to form the forward two-dimensional live sonar image was received at substantially a same time by the plurality of transducer elements;

generate a second sonar image of the underwater environment downward from the watercraft, wherein the second sonar image is a downward two-dimensional live sonar image that is formed of sonar return data from multiple sonar return beams that correspond to the first range of angles, and wherein the sonar return data used to form the downward two-dimensional live sonar image was received at substantially a same time by the plurality of transducer elements;

generate a third sonar image of the underwater environment downward from the watercraft, wherein the third sonar image is formed from the determined plurality of the multiple sonar return beams that corresponds to the fourth range of angles, wherein the third sonar image is formed of a plurality of sonar image portions built up over time, wherein each of the plurality of sonar image portions corresponds to sonar return data from the determined plurality of the multiple sonar return beams received at different times; and generate a fourth sonar image of the underwater environment downward from the watercraft, wherein the fourth sonar image is formed from the determined one or more of the multiple sonar return beams that includes the angle within the first range of angles that is substantially straight downward from the watercraft, wherein the fourth sonar image is formed of a plurality of sonar image portions built up over time, wherein each of the plurality of sonar image portions corresponds to sonar return data from the determined one or more of the multiple sonar return beams received at different times.

10. The transducer assembly of claim 9 further comprising an orientation sensor configured to determine an orientation of the single array, and wherein the sonar signal processor is further configured to (i) determine the plurality of the multiple sonar return beams that correspond to the fourth range of angles based on data from the orientation sensor, and (ii) determine the one or more of the multiple sonar return beams that includes the angle within the first range of angles that is substantially straight downward from the watercraft based on the data from the orientation sensor.

11. The transducer assembly of claim 9, wherein the first range of angles is defined by a fore-to-aft angle around 22.5° and the second range of angles is defined by a fore-to-aft angle around 22.5°.

12. The transducer assembly of claim 9, wherein the fourth range of angles includes angles that extend to each side of the angle within the first range of angles that is substantially straight downward from the watercraft.

13. The transducer assembly of claim 12, wherein the fourth range of angles are determined such that the angle within the first range of angles that is substantially straight downward from the watercraft is generally in a center of the fourth range of angles.

14. The transducer assembly of claim 9, wherein the plurality of the multiple sonar return beams that correspond to the fourth range of angles are the same as the multiple sonar return beams that correspond to the first range of angles from the single array.

15. A system for imaging an underwater environment of a body of water, the system comprising:

a single array of a plurality of transducer elements mountable to a watercraft for use on the body of water, wherein, when mounted, the single array of the plurality of transducer elements is configured to be oriented with an emitting face in a facing direction that is generally forward and downward of the watercraft, wherein the emitting face of the single array of the plurality of transducer elements defines a width and a length, wherein the length of the emitting face is greater than the width of the emitting face, and wherein the length of the emitting face extends in a fore-to-aft direction of the watercraft, wherein the facing direction is perpendicular to the emitting face, wherein the plurality of transducer elements are configured to transmit one or more sonar beams into the underwater environment by being operated at a fixed phase shift and varying in frequency so as to enable beamforming of multiple sonar return beams across the emitting face across a first range of angles in the fore-to-aft direction and across a second range of angles in the fore-to-aft direction, wherein the first range of angles cover a generally downward direction from the watercraft, wherein the second range of angles cover a generally forward and downward direction from the watercraft; and a sonar signal processor in communication with the plurality of transducer elements and configured to:

cause operation of the plurality of transducer elements to transmit the one or more sonar beams into the underwater environment;

receive sonar return data from the plurality of transducer elements;

determine a plurality of the multiple sonar return beams from within the first range of angles that cover at least a substantially straight downward direction from the watercraft and form a beam shape that is defined by a fore-to-aft angle within a range of 10°-45° in the fore-to-aft direction and a port-to-starboard angle within a range of 10°-27° in a port-to-starboard direction, wherein the fore-to-aft angle is the angle within the first range of angles that corresponds to the determined plurality of the multiple sonar return beams;

determine one or more of the multiple sonar return beams from within the first range of angles that cover at least the substantially straight downward direction from the watercraft and form a fan-shaped beam that is defined by a fore-to-aft angle within a range of 0.5°-3° in the fore-to-aft direction and a port-to-starboard angle within a range of 10°-27° in the port-to-starboard direction, wherein the fore-to-aft angle is the angle within the first range of angles that corresponds to the determined one or more of the multiple sonar return beams;

generate a first sonar image of the underwater environment forward and downward from the watercraft, wherein the first sonar image is a forward two-dimensional live sonar image that is formed of sonar return data from multiple sonar return beams that correspond to the second range of angles, and wherein the sonar return data used to form the forward two-dimensional live sonar image was received at substantially a same time by the plurality of transducer elements;

generate a second sonar image of the underwater environment downward from the watercraft, wherein the second sonar image is a downward two-dimensional live sonar image that is formed of sonar return data from multiple sonar return beams that correspond to the first range of angles, and wherein the sonar return data used to form the downward two-dimensional live sonar image was received at substantially a same time by the plurality of transducer elements;

generate a third sonar image of the underwater environment downward from the watercraft, wherein the third sonar image is formed from the determined plurality of the multiple sonar return beams, wherein the third sonar image is formed of a plurality of sonar image portions built up over time, wherein each of the plurality of sonar image portions corresponds to sonar return data from the determined plurality of the multiple sonar return beams received at different times; and generate a fourth sonar image of the underwater environment downward from the watercraft, wherein the fourth sonar image is formed from the determined one or more of the multiple sonar return, wherein the fourth sonar image is formed of a plurality of sonar image portions built up over time, wherein each of the plurality of sonar image portions corresponds to sonar return data from the determined one or more of the multiple sonar return beams received at different times.

16. The system of claim 15 further comprising an orientation sensor configured to determine an orientation of the single array, and wherein the sonar signal processor is further configured to (i) determine the plurality of the multiple sonar return beams based on data from the orientation sensor, and (ii) determine the one or more of the multiple sonar return beams based on the data from the orientation sensor.

17. The system of claim 15, wherein the first range of angles is defined by a fore-to-aft angle around 22.5° and the second range of angles is defined by a fore-to-aft angle around 22.5°.

18. The system of claim 15, wherein the determined plurality of the multiple sonar return beams correspond to the first range of angles from the single array.

19. The system of claim 15 further comprising a user interface including a display, wherein the user interface is configured to receive user input, wherein the sonar signal processor is configured to receive an indication of user input indicating a selection to present the first sonar image and, in response, cause the user interface to present the first sonar image.

20. The system of claim 19, wherein the sonar signal processor is configured to receive an indication of user input indicating a selection to present both the first sonar image and the fourth sonar image and, in response, cause the user interface to present both the first sonar image and the fourth sonar image in split screen mode.

* * * * *